(12) United States Patent
Wang

(10) Patent No.: US 11,784,891 B2
(45) Date of Patent: Oct. 10, 2023

(54) LEARNING SYSTEM THAT COLLECTS LEARNING DATA ON EDGE SIDE, ELECTRONIC APPARATUS, CONTROL METHOD FOR ELECTRONIC APPARATUS, AND STORAGE MEDIUM

(71) Applicant: CANON KABUSHIKI KAISHA, Tokyo (JP)

(72) Inventor: Xiaoli Wang, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 258 days.

(21) Appl. No.: 17/389,066

(22) Filed: Jul. 29, 2021

(65) Prior Publication Data
US 2022/0045913 A1   Feb. 10, 2022

(30) Foreign Application Priority Data
Aug. 5, 2020 (JP) ................................. 2020-133136

(51) Int. Cl.
*H04L 41/06* (2022.01)
*H04L 41/14* (2022.01)
*H04L 41/16* (2022.01)
*G06N 20/00* (2019.01)
*G06F 18/24* (2023.01)

(52) U.S. Cl.
CPC ............ *H04L 41/145* (2013.01); *G06F 18/24* (2023.01); *G06N 20/00* (2019.01); *H04L 41/16* (2013.01)

(58) Field of Classification Search
CPC ...... G06F 3/121; G06F 3/1229; G06F 3/1286; G06F 3/1287; G06F 18/24; G06N 3/044; G06N 3/045; G06N 3/08; G06N 20/00; G06V 10/7753; H04L 41/145; H04L 41/16; H04L 43/0817

See application file for complete search history.

(56) References Cited

U.S. PATENT DOCUMENTS

| 10,423,865 | B1* | 9/2019 | Yeung | G06Q 10/20 |
| 11,117,762 | B2* | 9/2021 | Kanada | B65H 5/06 |
| 11,461,057 | B2* | 10/2022 | Harai | G06F 3/121 |
| 2019/0036716 | A1* | 1/2019 | Kasaragod | H04L 63/104 |
| 2020/0393998 | A1* | 12/2020 | Su | G06F 3/1256 |

FOREIGN PATENT DOCUMENTS

JP    2019-179993 A    10/2019

* cited by examiner

*Primary Examiner* — Frank Duong
(74) *Attorney, Agent, or Firm* — Canon U.S.A., Inc. IP Division

(57) ABSTRACT

A system includes a cloud computing system having a server, and a user environment computing system having an edge electronic device and a group of edge side sensors installed on at least one of inside and outside of the edge electronic device, the cloud computing system and the user environment computing system connected via a network line. The user environment computing system transfers a plurality of kinds of detection data collected by the group of edge side sensors to the cloud computing system for learning of an inference model generated by the server. When detection data is newly obtained from one sensor out of the group of edge side sensors and the detection data newly obtained is related to the inference model, the detection data newly obtained is transferred to the server for additional learning of the inference model.

21 Claims, 17 Drawing Sheets

FIG. 5C

| DETECTION DATA | PREDICTIVE EVENT |
|---|---|
| LIFE OF HDD<30%, THE NUMBER OF SHEETS TO BE PRINTED WITHIN ONE MONTH>50,000 | HDD BREAKS |
| THE NUMBER OF PEOPLE STAYING IN OFFICE>15, THE NUMBER OF SHEETS TO BE PRINTED PER PERSON>20,000 | WAITING TIME OF USER>5min |
| TEMPERATURE<6°C, HUMIDITY>60 | START-UP TIME DUE TO MORNING CONDENSATION>1min |
| THE NUMBER OF TONERS IN STOCK<3, THE NUMBER OF SHEETS TO BE PRINTED PER DAY>2,000 | GIVE ORDER |
| KEY PARTS BREAK, THE NUMBER OF STAND-BY MACHINES>2 | COMPLAINT OCCURS |
| IT IS PAST 23:00, THE NUMBER OF PEOPLE STAYING IN OFFICE<1 | CAT APPEARS |

FIG. 6

| COMPUTING DEVICE | GENERAL-PURPOSE PROPERTY | PERFORMANCE | ◆LEARNING | ◆INFERENCE | EDGE | SERVER |
|---|---|---|---|---|---|---|
| CPU | High | Low | Low | Low | Yes | Yes |
| GPU/ASIC FOR LEARNING | Middle | Middle | High | High | No | Yes |
| OTHER ASICS | Low | High | No | No | Yes | No |

FIG. 8A

| DETECTION DATA | PREDICTIVE EVENT | RISK GRADE |
|---|---|---|
| LIFE OF HDD<30%, THE NUMBER OF SHEETS TO BE PRINTED WITHIN ONE MONTH>50,000 | HDD BREAKS | HIGH RISK |
| THE NUMBER OF PEOPLE STAYING IN OFFICE>15, THE NUMBER OF SHEETS TO BE PRINTED PER PERSON>20,000 | WAITING TIME OF USER>5min | HIGH RISK |
| TEMPERATURE<6°C, HUMIDITY>60 | START-UP TIME DUE TO MORNING CONDENSATION >1min | HIGH RISK |
| THE NUMBER OF TONERS IN STOCK<3, THE NUMBER OF SHEETS TO BE PRINTED PER DAY>2,000 | GIVE ORDER | MEDIUM RISK |
| KEY PARTS BREAK, THE NUMBER OF STAND-BY MACHINES>2 | COMPLAINT OCCURS | MEDIUM RISK |
| IT IS PAST 23:00, THE NUMBER OF PEOPLE STAYING IN OFFICE<1 | CAT APPEARS | LOW RISK |
| CONTINUOUS ENERGIZATION, CONTROLLER IS OUT OF CONTROL | RISK OF IGNITION OCCURS | HIGH RISK |

FIG. 9

| | | INFERENCE MODEL 1 | INFERENCE MODEL 2 | INFERENCE MODEL 3 | INFERENCE MODEL 4 | INFERENCE MODEL 5 | INFERENCE MODEL 6 | ... | INFERENCE MODEL L |
|---|---|---|---|---|---|---|---|---|---|
| DATA 1 | LIFE OF HDD<30% | ○ | | | | | | | |
| DATA 2 | THE NUMBER OF SHEETS TO BE PRINTED WITHIN ONE MONTH>50,000 | ○ | | | | | | | |
| DATA 3 | THE NUMBER OF PEOPLE STAYING IN OFFICE>15 | | ○ | ○ | | | | | |
| DATA 4 | THE NUMBER OF SHEETS TO BE PRINTED PER PERSON>20,000 | | ○ | ○ | | | | | |
| DATA 5 | TEMPERATURE<6°C | | | | | ○ | | | |
| DATA 6 | HUMIDITY>60 | | | | | ○ | | | |
| DATA 7 | THE NUMBER OF TONERS IN STOCK<3 | | | | | | | | |
| DATA 8 | THE NUMBER OF SHEETS TO BE PRINTED PER DAY>2,000 | | | | ○ | | | | |
| DATA 9 | KEY PARTS BREAK | | | | ○ | | | | |
| DATA 10 | THE NUMBER OF STAND-BY MACHINES>2 | | | | | | | | |
| DATA 11 | IT IS PAST 23:00 | | | | | | ○ | | |
| DATA 12 | THE NUMBER OF PEOPLE STAYING IN OFFICE<1 | | | | | | ○ | | |
| DATA 13 | CONTINUOUS ENERGIZATION | | | | | | | | |
| DATA 14 | CONTROLLER IS OUT OF CONTROL | | | | | | | | |
| ... | | ... | ... | ... | ... | ... | ... | ... | ... |
| DATA M | DETAILS M | | | | | | | | |
| PREDICTIVE EVENT 1 | HDD BREAKS | ○ | | | | | | | |
| PREDICTIVE EVENT 2 | WAITING TIME OF USER>5min | | | ○ | | | | | |
| PREDICTIVE EVENT 3 | START-UP TIME DUE TO MORNING CONDENSATION>1min | | | | | ○ | | | |
| PREDICTIVE EVENT 4 | GIVE ORDER | | ○ | | | | | | |
| PREDICTIVE EVENT 5 | COMPLAINT OCCURS | | | | ○ | | | | |
| PREDICTIVE EVENT 6 | CAT APPEARS | | | | | | ○ | | |
| ... | | ... | ... | ... | ... | ... | ... | ... | ... |
| PREDICTIVE EVENT N | DETAILS N | | | | | | | | |

FIG. 12

| | INFERENCE MODEL 1 | INFERENCE MODEL 2 | INFERENCE MODEL 3 | INFERENCE MODEL 4 | INFERENCE MODEL 5 | INFERENCE MODEL 6 | ... | INFERENCE MODEL L |
|---|---|---|---|---|---|---|---|---|
| THE NUMBER OF TIMES OF LEARNING | 150 | 1760 | 1003 | 399 | 255 | 17 | ... | ... |

FIG. 13

| | INFERENCE MODEL 1 | INFERENCE MODEL 2 | INFERENCE MODEL 3 | INFERENCE MODEL 4 | INFERENCE MODEL 5 | INFERENCE MODEL 6 | ... | INFERENCE MODEL L |
|---|---|---|---|---|---|---|---|---|
| RELATIONSHIP WITH INFERENCE MODEL | Yes | No | Yes | Yes | No | No | ... | Yes |
| THE NUMBER OF TIMES OF LEARNING OF SAID INFERENCE MODEL | 150 | 1760 | 1003 | 399 | 255 | 17 | ... | ... |
| PREDICTION/ INFERENCE ACCURACY | 70% | 98% | 93% | 77% | 65% | 33% | ... | ... |

LEARNING SYSTEM THAT COLLECTS LEARNING DATA ON EDGE SIDE, ELECTRONIC APPARATUS, CONTROL METHOD FOR ELECTRONIC APPARATUS, AND STORAGE MEDIUM

BACKGROUND

Field of the Disclosure

The present disclosure relates to a learning system, an electronic apparatus, a control method for the electronic apparatus, and a storage medium, and more particularly, to a learning system that an edge side collects learning data required to generate an inference model on a cloud side, an electronic apparatus, a control method for the electronic apparatus, and a storage medium.

Description of the Related Art

Recently, edge-cloud computing has become widespread. Generally, a processing that has a small amount of calculation is performed on the edge side (by a terminal device located in a user environment) and a processing that has a large amount of calculation is performed on the cloud (by a server on a network).

As a case example, in the case where a multifunction printer (hereinafter referred to as "MFP") is delivered to the user environment, usually, the MFP performs processes such as copying and printing and transfers user logs, settings, etc. to the server, and the server analyzes the transferred the user logs, the settings, etc.

On the other hand, there is a possibility that data transferred from the edge side to the cloud side in order to generate an inference model will oppress a band of the network. Techniques are known to reduce the amount of data transferred in order to prevent such oppression of the band of the network.

For example, Japanese Laid-Open Patent Publication (kokai) No. 2019-179993 discloses a technique that a multi-access edge computing (MEC) node obtains data of a measured traffic amount within each cell (target cell) formed by each base station, from each base station, and predicts a traffic amount after a unit time within the target cell on the basis of the measured traffic amount. When receiving an inquiry about whether or not data can be transmitted from a vehicle within the target cell, the MEC node makes a decision whether or not to allow transmission of the data on the basis of a prediction result of the traffic amount and the amount of data scheduled to be transmitted by the said vehicle, indicated by information contained in the said inquiry. The MEC node transmits a response that indicates whether or not to allow the transmission of the data, to the vehicle being a transmission origin of the inquiry, depending on the result of the decision.

However, there are several issues in the technique of Japanese Laid-Open Patent Publication (kokai) No. 2019-179993.

For example, there is one issue that since the edge (vehicle) side cannot make the decision whether or not to transfer the data, communications between the edge and the base station for making such a decision occur. Further, there is one more issue that only condition used for the decision is "the amount of data scheduled to be transmitted", but the amount of data scheduled to be transmitted is not necessarily proportional to its usefulness.

SUMMARY

Embodiments of the present disclosure provide a learning system capable of efficiently reducing the amount of data transferred from an edge side to a cloud side for learning of an inference model, an electronic apparatus, a control method for the electronic apparatus, and a storage medium.

Accordingly, embodiments of the present disclosure provide a system comprising a cloud computing system having a server, and a user environment computing system having an edge electronic device and a group of edge side sensors installed on at least one of inside and outside of the edge electronic device, wherein the cloud computing system and the user environment computing system are connected via a network line, wherein the user environment computing system comprises a data transfer unit configured to transfer a plurality of kinds of detection data collected by the group of edge side sensors to the cloud computing system for learning of an inference model generated by the server, wherein the cloud computing system comprises a model transmission unit configured to transmit the inference model to the edge electronic device after the learning of the inference model performed by the server is completed, and wherein after the inference model is transmitted by the model transmission unit, when the detection data is newly obtained from one sensor out of the group of edge side sensors, in a case that the detection data newly obtained is not related to the inference model, the data transfer unit does not transfer the detection data newly obtained to the server, while in a case that the detection data newly obtained is related to the inference model, the data transfer unit transfers the detection data newly obtained to the server for additional learning of the inference model.

Accordingly, embodiments of the present disclosure provide a system comprising a cloud computing system having a server, and a user environment computing system having an edge electronic device and a group of edge side sensors installed on at least one of inside and outside of the edge electronic device, wherein the cloud computing system and the user environment computing system are connected via a network line, wherein the user environment computing system comprises a data transfer unit configured to transfer a plurality of kinds of detection data collected by the group of edge side sensors to the cloud computing system for learning of an inference model generated by the server, wherein the cloud computing system comprises a model transmission unit configured to transmit the inference model to the edge electronic device during the learning of the inference model performed by the server, and wherein after the inference model is transmitted by the model transmission unit, when the detection data is newly obtained from one sensor out of the group of edge side sensors, in a case that a certainty factor of the inference model is smaller than a predetermined value, the data transfer unit transfers the detection data newly obtained to the server for additional learning of the inference model.

Accordingly, embodiments of the present disclosure provide a system comprising a cloud computing system having a server, and a user environment computing system having an edge electronic device and a group of edge side sensors installed on at least one of inside and outside of the edge electronic device, wherein the cloud computing system and the user environment computing system are connected via a network line, wherein the user environment computing system comprises a data transfer unit configured to transfer a plurality of kinds of detection data collected by the group of edge side sensors to the cloud computing system for learning of a plurality of inference models generated by the server, and wherein in a case that the number of times of learning on the server of an inference model related to the detection data newly obtained from one sensor out of the group of edge side sensors among the plurality of inference models is equal to or less than a predetermined number of times, the data transfer unit transfers the detection data newly obtained to the server for additional learning of the inference model.

Accordingly, embodiments of the present disclosure provide a system comprising a cloud computing system having a server, and a user environment computing system having an edge electronic device and a group of edge side sensors installed on at least one of inside and outside of the edge electronic device, wherein the cloud computing system and the user environment computing system are connected via a network line, wherein the user environment computing system comprises a data transfer unit configured to transfer a plurality of kinds of detection data collected by the group of edge side sensors from the user environment computing system to the cloud computing system for learning of a plurality of inference models generated by the server, wherein the cloud computing system comprises a novel data obtaining unit configured to obtain an event newly transferred as the detection data by the data transfer unit as novel data, a calculating unit configured to calculate a rarity evaluation value by using the novel data and the plurality of inference models, and a classifying unit configured to classify whether the novel data is data that has no learning likelihood of the plurality of inference models or data that has learning likelihood of the plurality of inference models based on the rarity evaluation value, and wherein in a case that the novel data is classified as the data that has learning likelihood by the classifying unit, the novel data is used for the learning of the plurality of inference models.

Accordingly, embodiments of the present disclosure provide an electronic apparatus comprising a group of edge side sensors installed on at least one of inside and outside, wherein the electronic apparatus is connected to a cloud computing system having a server via a network line, wherein the electronic apparatus comprises a data transfer unit configured to transfer a plurality of kinds of detection data collected by the group of edge side sensors to the cloud computing system for learning of an inference model generated by the server, and wherein after the learning of the inference model performed by the server is completed and the inference model is transferred from the cloud computing system, when the detection data is newly obtained from one sensor out of the group of edge side sensors, in a case that the detection data newly obtained is not related to the inference model, the data transfer unit does not transfer the detection data newly obtained to the server, while in a case that the detection data newly obtained is related to the inference model, the data transfer unit transfers the detection data newly obtained to the server for additional learning of the inference model.

Accordingly, embodiments of the present disclosure provide an electronic apparatus comprising a group of edge side sensors installed on at least one of inside and outside, wherein the electronic apparatus is connected to a cloud computing system having a server via a network line, wherein the electronic apparatus comprises a data transfer unit configured to transfer a plurality of kinds of detection data collected by the group of edge side sensors to the cloud computing system for learning of an inference model generated by the server, and wherein after the inference model is transferred from the cloud computing system during the learning of the inference model performed by the server, when the detection data is newly obtained from one sensor out of the group of edge side sensors, in a case that a certainty factor of the inference model is smaller than a predetermined value, the data transfer unit transfers the detection data newly obtained to the server for additional learning of the inference model.

Accordingly, embodiments of the present disclosure provide an electronic apparatus comprising a group of edge side sensors installed on at least one of inside and outside, wherein the electronic apparatus is connected to a cloud computing system having a server via a network line, wherein the electronic apparatus comprises a data transfer unit configured to transfer a plurality of kinds of detection data collected by the group of edge side sensors to the cloud computing system for learning of a plurality of inference models generated by the server, and wherein in a case that the number of times of learning on the server of an inference model related to the detection data newly obtained from one sensor out of the group of edge side sensors among the plurality of inference models is equal to or less than a predetermined number of times, the data transfer unit transfers the detection data newly obtained to the server for additional learning of the inference model.

According to embodiments of the present disclosure, it is possible to efficiently reduce the amount of data transferred from the edge side to the cloud side.

Further features of the present disclosure will become apparent from the following description of exemplary embodiments with reference to the attached drawings.

BRIEF DESCRIPTION OF THE DRAWINGS

FIGS. 5A, 5B and 5C are diagrams for explaining an inference model generated in a step S402 of FIG. 4.

FIG. 6 is a table used for an explanation about computing devices that are used in the MFP and a server of FIG. 3.

FIG. 8A is a diagram for explaining the inference model generated in the server when a modification of the data transfer control processing of FIG. 7 is executed.

FIG. 9 is a diagram for explaining various inference models generated by machine learning in a second embodiment.

FIG. 12 is a diagram for explaining an outline of a data obtaining control processing according to the second embodiment.

FIG. 13 is a diagram for explaining a method that classifies whether or not there is a learning likelihood of an inference model using novel data, according to a third embodiment.

DESCRIPTION OF THE EMBODIMENTS

In the future, it is expected that on the edge side, a plurality of sensors that is installed on inside or outside of the MFP, detect information such as the number of sheets to be printed, a toner residual quantity, a humidity, a temperature, the number of users, and various phenomena, and on the cloud side, correlation among a plurality of pieces of information detected is analyzed by means of machine learning and then the inference model is built.

By using such an inference model, it becomes possible to predict events that occur in the MFP, such as "a failure of hard disk drive (HDD)", "toner is out of stock" and "start-up time is abnormally long" and prevent the occurrence of these events in advance.

Embodiments of the present disclosure will now be described in detail below with reference to the accompanying drawings showing embodiments thereof.

At first, a first embodiment of the present disclosure will now be described with reference to the drawings. An image forming device 1 as an electronic apparatus according to the first embodiment (hereinafter referred to as "MFP") will be described.

Figure 1:
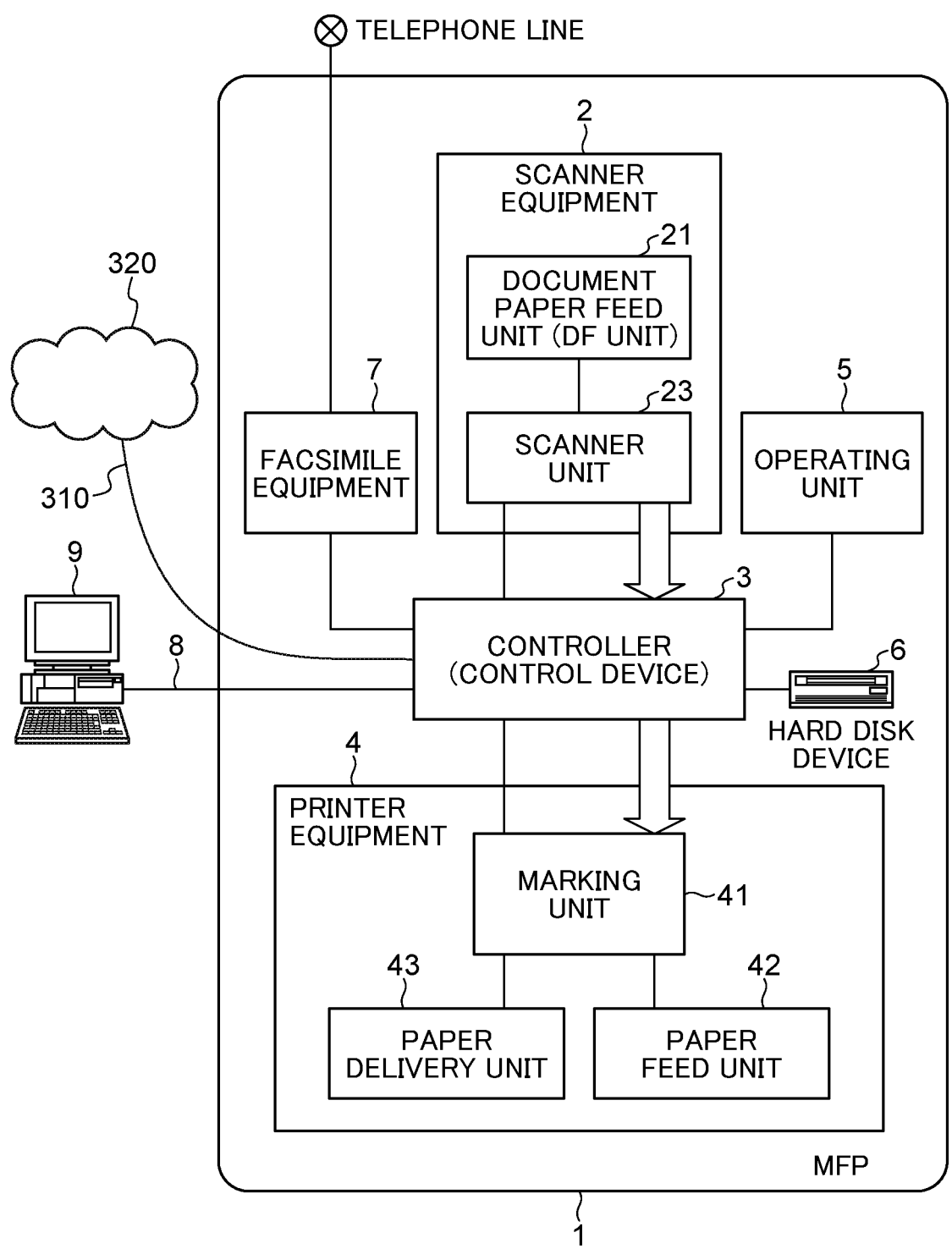
FIG. 1 is a block diagram showing a hardware configuration of an MFP as an electronic apparatus according to a first embodiment.

FIG. 1 is a block diagram showing a hardware configuration of the MFP 1.

The MFP 1 has a scanner equipment 2, a printer equipment 4, an operation unit 5, a hard disk device (hereinafter referred to as "HDD device") 6, a facsimile equipment 7 and a controller 3 that is connected to these modules. Further, the MFP 1 is connected to a personal computer (PC) 9 via a local area network (LAN) 8 and is connected to a cloud 320 via a network line 310.

The scanner equipment 2 optically reads an image from a document and converts it into a digital image.

The printer equipment 4 outputs the digital image to a paper device.

The operation unit 5 accepts user's operations and displays various information to the user.

The HDD device 6 stores digital images, control programs, etc. Further, the HDD device 6 retains inference models (more specifically, various parameters thereof) transferred from the cloud 320.

The facsimile equipment 7 transmits the digital image to a telephone line or the like.

The controller 3 executes jobs on the MFP 1 by issuing instructions to each module within the MFP 1.

The scanner equipment 2 is comprised of a document paper feed unit 21 capable of automatically and sequentially replacing a bundle of documents and a scanner unit 23 capable of optically scanning the document and converting it into the digital image. The scanner equipment 2 transmits the converted image data to the controller 3.

The printer equipment 4 is comprised of a paper feed unit 42 capable of sequentially feeding paper one by one from a bundle of sheets, a marking unit 41 for printing the image data on a sheet of paper that is fed, and a paper delivery unit 43 for ejecting the printed sheet of paper.

Further, the controller 3 performs executions of the jobs, input/output control of the digital image, and giving instructions etc. to the scanner equipment 2 and printer equipment 4, depending on instructions from the PC 9. For example, in the first embodiment, when the PC 9 issues a turn-off instruction to the controller 3, the controller 3 controls a turn-off process of the MFP 1.

As exemplified below, the MFP 1 has various functions for executing various jobs.

A copy function that records images read from the scanner equipment 2 in the HDD device 6 and at the same time performs printing by using the printer equipment 4

An image transmission function that transmits the images read from the scanner equipment 2 to the computer 9 via the LAN 8

An image storage function that records images read from the scanner equipment 2 in the HDD device 6 and performs image transmission and image printing as necessary An image printing function that analyzes, for example, a page description language transmitted from the computer 9 and performs printing by means of the printer equipment 4

In order to realize such a plurality of functions, the MFP 1 obtains detection data from various sensors that are installed on inside and outside of the MFP 1. Specifically, the MFP 1 collects information such as a power consumption, an operating status of a built-in HDD (whether or not the built-in HDD has failed), a temperature of the marking unit, an internal humidity, an external humidity, etc. as the detection data.

Moreover, various sensors mounted on the operation unit 5 for accepting the user's operations, are included in the above sensors. Specifically, in the first embodiment, the MFP 1 also collects information transmitted from a "human-body detecting sensor" for detecting the user and information obtained by means of "Bluetooth (registered trademark)" for detecting a mobile device's position etc. as the detection data.

Furthermore, the detection data in the first embodiment also includes data that is extracted from contents of the jobs processed by the MFP 1 and then is accumulated. For example, data such as the number of sheets to be printed that is instructed by the computer 9 and the number of copies for each user is also included in the detection data.

Figure 7:
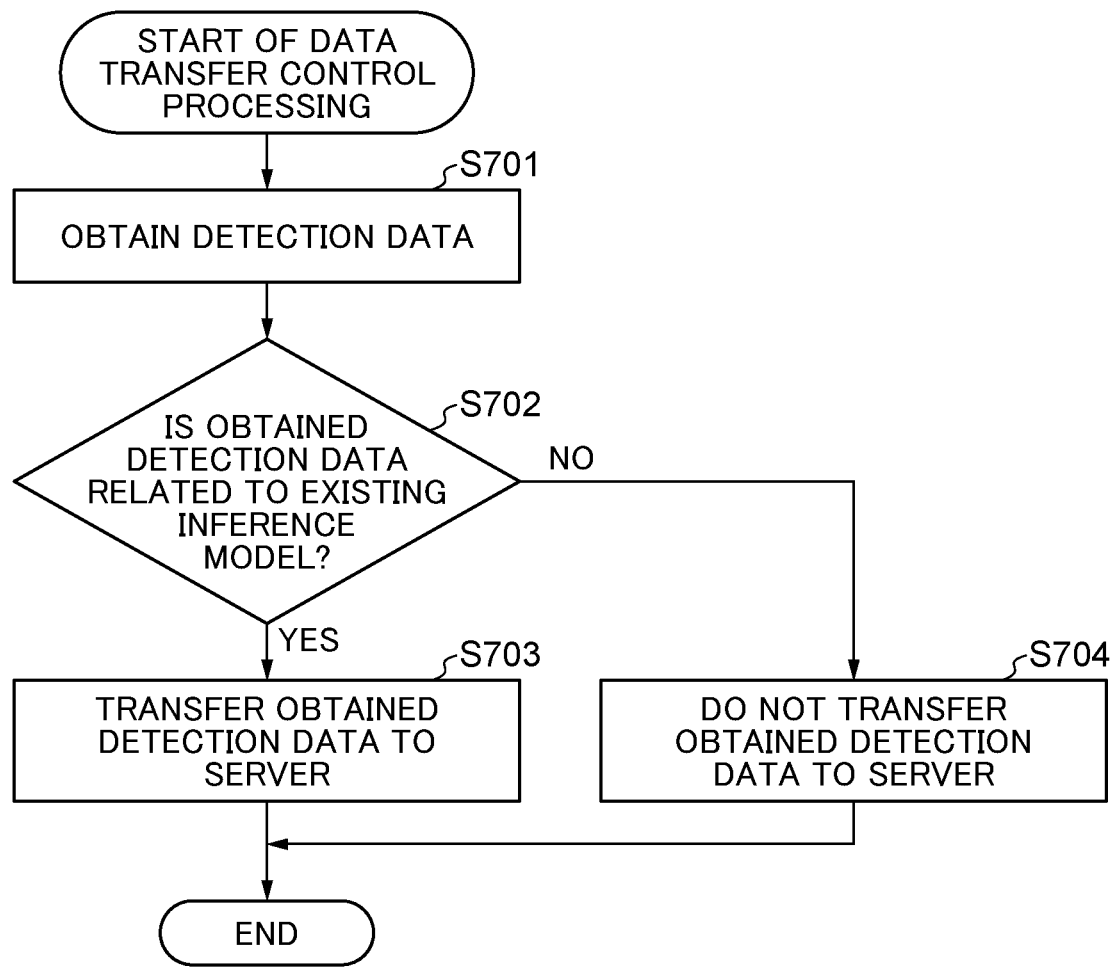
FIG. 7 is a flowchart of a data transfer control processing according to the first embodiment, executed by an edge side CPU.

The detection data is accumulated inside the MFP 1, and in the case of judging that the detection data is related to an existing inference model in a data transfer control processing that will be described later in FIG. 7, is transferred to a server 321 that will be described later in FIG. 3 via the network.

Figure 2:
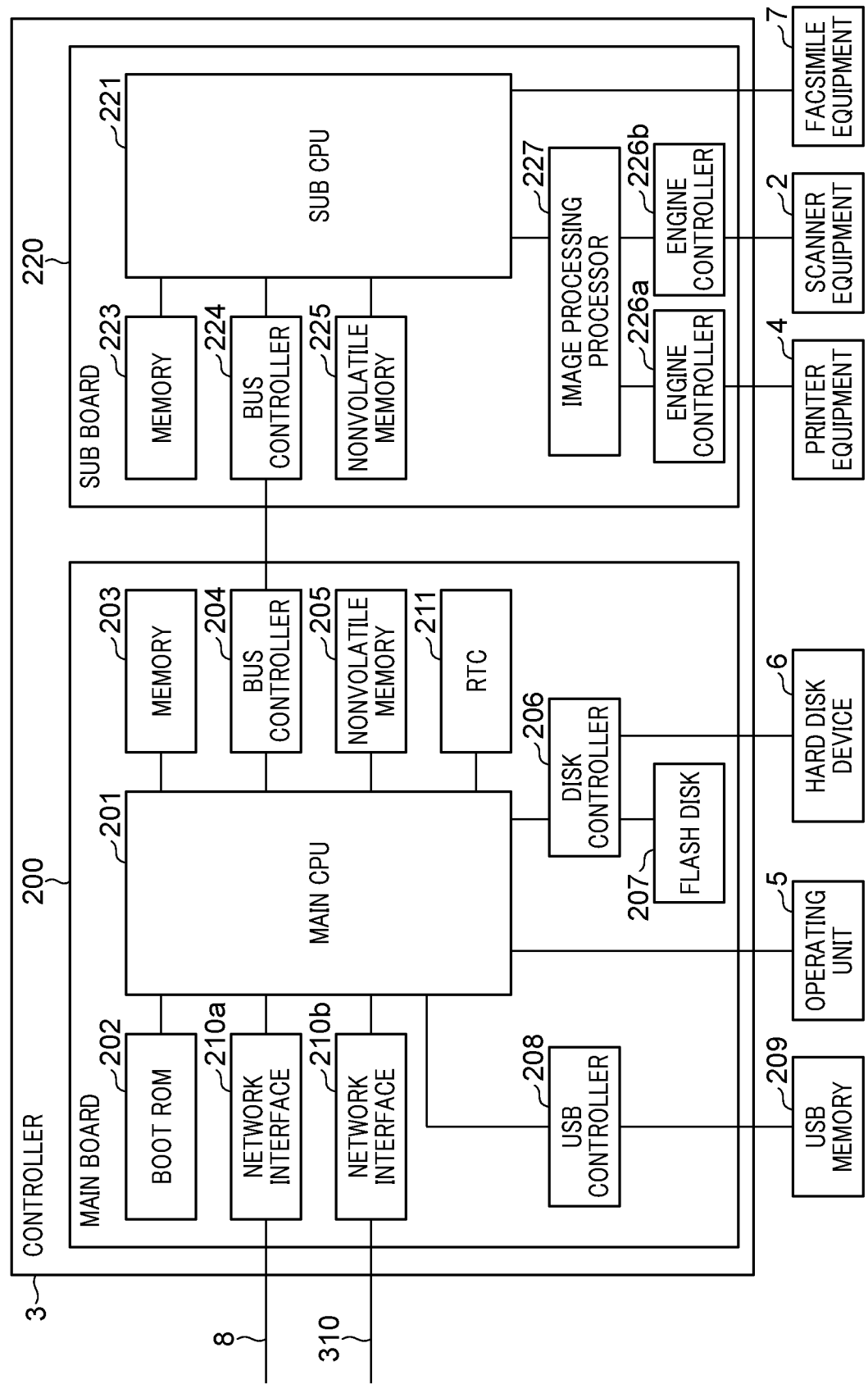
FIG. 2 is a block diagram showing details of a hardware configuration of a controller in FIG. 1.

FIG. 2 is a block diagram showing details of a hardware configuration of the controller 3 in FIG. 1.

The controller 3 is comprised of a main board 200 and a sub board 220.

The main board 200 is a board that constitutes a general-purpose central processing unit (CPU) system. The main board 200 has a main CPU 201, a boot ROM 202, a memory 203, a bus controller 204, a nonvolatile memory 205 and a real-time clock (RTC) 211.

The main CPU 201 controls the whole of the main board 200, and is connected to the operation unit 5 located outside the controller 3 so as to control the operation unit 5.

The boot ROM 202 is a ROM that contains a boot program.

The memory 203 is a memory used by the main CPU 201 as a working memory.

The bus controller 204 is an external bus that has a bridging function with a bus controller 224, which will be described later and is located inside the sub board 220.

The nonvolatile memory 205 is a memory that retains stored contents even in the case of power is turned off.

The RTC 211 has a clock function.

Furthermore, the main board 200 has a disk controller 206, a flash disk 207, a universal serial bus (UBS) controller 208, and network interfaces 210a and 210b.

The disk controller 206 is connected to the flash disk 207 and a storage device such as the HDD device 6 that is located outside the controller 3 so as to control the flash disk 207 and the storage device.

The flash disk 207 is a relatively small-capacity nonvolatile storage device that is composed of semiconductor devices. For example, the flash disk 207 is composed of a solid-state drive (SSD) or the like.

The UBS controller 208 is connected to a USB memory 209 located outside the controller 3 and is a control unit capable of controlling the USB memory 209.

The network interface 210a is connected to the PC 9 (not shown in FIG. 2, but shown in FIG. 1) via the LAN 8, and the network interface 210b is connected to the cloud 320 (not shown in FIG. 2, but shown in FIG. 1) via the network line 310.

The sub board 220 is a board smaller than the main board 200 that constitutes the general-purpose CPU system. The sub board 220 has a sub CPU 221, a memory 223, a bus controller 224 and a nonvolatile memory 225.

The sub CPU 221 controls the whole of the sub board 220, and is directly connected to the facsimile equipment 7 located outside the controller 3 so as to control the facsimile equipment 7.

The memory 223 is used by the sub CPU 221 as a working memory.

The bus controller 224 is an external bus that has a bridging function with the bus controller 204, which is located inside the main board 200.

The nonvolatile memory 225 is a memory that retains stored contents even in the case of power is turned off.

Furthermore, the sub board 220 has an image processing processor 227 that performs digital image processing in real time, and engine controllers 226a and 226b that are connected to the image processing processor 227.

The engine controller 226a is further connected to the printer equipment 4 located outside the controller 3, and performs digital image data transfer between the image processing processor 227 and the printer equipment 4.

The engine controller 226b is further connected to the scanner equipment 2 located outside the controller 3, and performs digital image data transfer between the image processing processor 227 and the scanner equipment 2.

Moreover, each hardware of the block diagram of FIG. 2 is simplified.

For example, although the main CPU 201 and the sub CPU 221 include a large number of CPU peripheral hardware such as chipsets, bus bridges, and clock generators, since these CPU peripheral hardware are unnecessary for the granularity of explanations about the main CPU 201 and the sub CPU 221, the main CPU 201 and the sub CPU 221 of FIG. 2 is simplified. Therefore, the block configuration shown in FIG. 2 does not limit the present disclosure.

An operation of the controller 3 will be described by taking an image copying using the paper device as an example.

When the user instructs the operation unit 5 to perform the image copying, the main CPU 201 sends an image reading command to the scanner equipment 2 via the sub CPU 221.

The scanner equipment 2 optically scans a paper document, converts it into digital image data, and inputs the digital image data to the image processing processor 227 via the engine controller 226b.

The image processing processor 227 temporarily stores the digital image data in the memory 223 via the sub CPU 221 by performing DMA (direct memory access) transfer.

When the main CPU 201 confirms that a certain amount or all of the digital image data has been stored in the memory 223, the main CPU 201 issues an image output instruction to the printer equipment 4 via the sub CPU 221.

The sub CPU 221 teaches the image processing processor 227 the position of the digital image data in the memory 223. As a result, the digital image data on the memory 223 is transmitted to the printer equipment 4 via the image processing processor 227 and the engine controller 226a depending on a synchronization signal from the printer equipment 4, and the digital image data is printed on the paper device by the means of printer equipment 4.

In the case of performing a plurality of times of the image copying, the main CPU 201 stores the digital image data of the memory 223 in the HDD device 6. As a result, each time of the image copying after the second time of the image copying, can be performed by transmitting the digital image data from the HDD device 6 to the printer equipment 4 without the scanner equipment 2 performing optical scanning of the paper document again.

Figure 3:
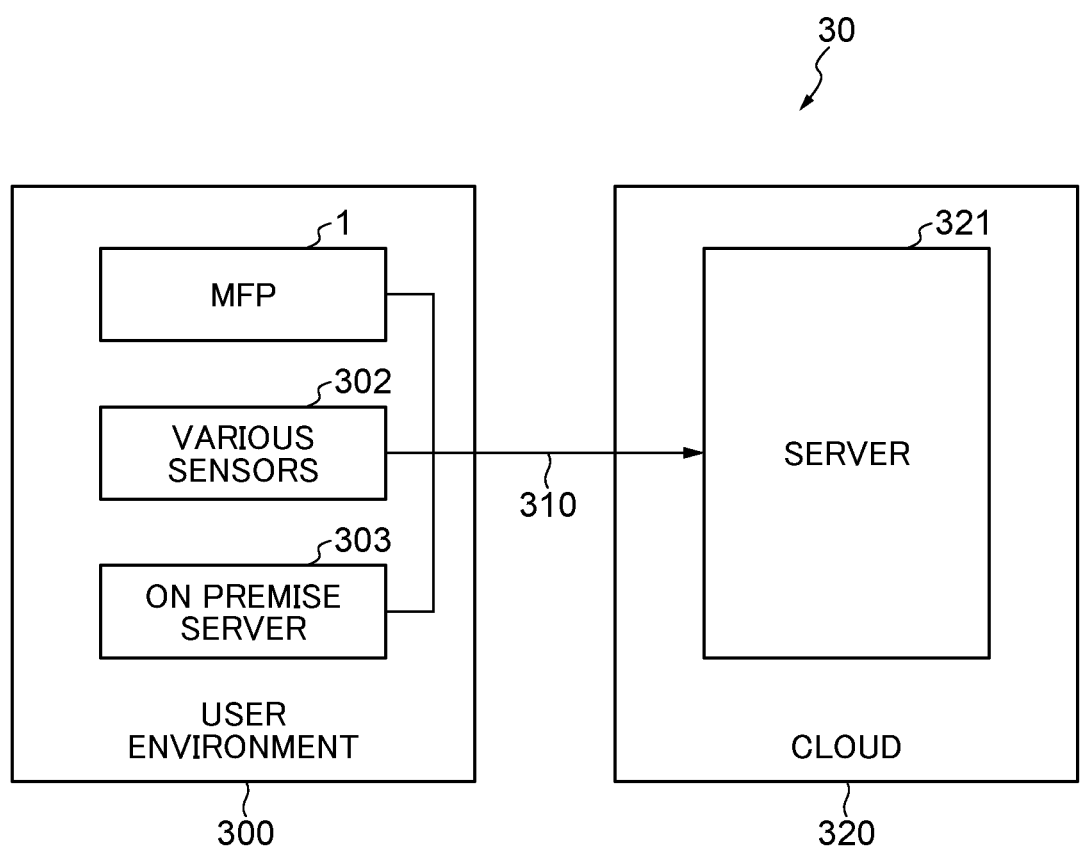
FIG. 3 is a diagram showing a configuration of a learning system according to the first embodiment.

FIG. 3 is a diagram showing a configuration of a learning system 30 according to the first embodiment.

As shown in FIG. 3, in the learning system 30, a user environment 300 having an edge device (the MFP 1 in the first embodiment) and the cloud 320 having a server are connected to each other via the network line 310.

In order to explain the configuration of the learning system 30 shown in FIG. 3, at first, the edge device will be described.

In an environment where IoT (Internet of Things) technology is advancing, it is necessary to collect a large amount of various detection data from sensors that are installed at manufacturing and sales sites. Therefore, it is necessary to obtain the detection data from sensors located inside the edge device (the MFP 1) that is installed in the site (the user environment 300) and various sensors 302 located outside the MFP 1 (hereinafter, simply referred to as "a group of edge side sensors").

On the other hand, since the edge device is designed to realize specific functions, the edge device is not suitable for storing and processing a large amount of the detection data. Therefore, it is common to once transfer all the detection data obtained by the edge device to the server 321, which is located in the cloud 320 and has a high-performance computing power, and then perform the processing in the server 321.

As shown in FIG. 3, in addition to the MFP 1, a plurality of devices is installed in the user environment 300, and is connected by an in-house infrastructure (a wired LAN, Wi-Fi (registered trademark), etc.).

The group of edge side sensors located inside the MFP 1, collects the detection data such as the operating status of the built-in device, the number of sheets to be printed, the toner residual quantity and the number of users, and transfers the collected detection data to the controller 3 of the MFP 1.

Further, the group of edge side sensors located outside the MFP 1 (various sensors 302) is installed in a usage environment of the MFP1, a warehouse and the like, collects the detection data such as the humidity, the temperature, a brightness, the number of toners in stock, the number of sheets of printing paper in stock, and transfers the collected detection data to the controller 3 of the MFP 1.

Furthermore, as shown in FIG. 3, an on premise server 303 that functions as a print server, may exist in the user environment 300.

As described above, in many cases, the MFP 1 being the edge device has only the minimum hardware for realizing the specific functions, and in that case, it may not be possible for the MFP 1 to process all the detection data obtained from the group of edge side sensors.

Therefore, it is common that the MFP 1 transfers the detection data collected to the server 321 located in the cloud 320 via the network line 310, and the server 321 performs an information processing.

Moreover, the configuration of the learning system 30 shown in FIG. 3 is merely an example, and is not limited to such a configuration.

For example, the learning system 30 may be configured to once aggregate the detection data collected by means of the group of edge side sensors in the on premise server 303 and then transfer the aggregated detection data to the server 321.

Further, the learning system 30 may be configured such that a plurality of surveillance cameras is installed in the user environment 300 instead of the MFP, and a learning model is trained on the server 321 so that characteristics of a suspicious person can be recognized from images obtained from the plurality of surveillance cameras. In this case, by transmitting the trained model (hereinafter referred to as "an inference model") from the server 321 to each surveillance camera in advance, each surveillance camera can detect a suspicious person who actually appears by using the inference model.

Recently, the development of IoT technology has made it possible to collect big data, which was not possible in the past. Further, due to performance improvements of smartphones, a large amount of photos, videos, documents, etc. are generated even in the user environment.

Furthermore, due to the evolution of network technology, to which wireless communication technology (4G, 5G, power saving and wide area communication) is applied, the big data is accumulated in the server located in the cloud, and there is a demand for analyzing the accumulated big data.

Since such big data cannot be processed by conventional methods, deep learning methods such as CNN (Convolution Neural Network), RNN (Recurrent Neural Network) and LSTM (Long Short-Term Memory) have been proposed, and practical applications of machine learning technology are advancing due to the evolution of high-performance hardware called GPGPU (General Purpose Graphic Processing Unit).

Specifically, a learning model is trained by a deep learning method using big data. For example, when an image of a cat is input to the learning model and the learning model is trained, the learning model can gradually recognize the image of the cat. By applying the learning model at a stage where a recognition accuracy (a certainty factor, i.e., a confidence rating) becomes a certain level or more by training as the inference model, it becomes possible to perform image recognition with a high accuracy. Therefore, for example, when applying the inference model to a photo newly taken with a smartphone, it becomes possible to determine whether or not a cat is contained the photo.

Next, the deep learning method will be described.

As conventional learning methods, for example, there is a learning method called feature engineering, but in the case of this learning method, a feature to be identified must be artificially specified in advance. For example, in order to recognize a human face, features such as eyes and nose must be defined. Therefore, in the case of appropriately specifying the feature to be identified, it is possible to generate an inference model with a good recognition accuracy; otherwise, there is an issue that it is impossible to generate an inference model with a good recognition accuracy.

On the other hand, in a new learning method called deep learning, the specification of the feature to be identified can be left to the algorithm. In deep learning, a feature amount may be specified as an initial value, but it is possible to further decompose the feature by an algorithm. For example, in the case that the nose is specified as the initial value, it is possible to decompose features of the nose into a triangle and circles (nostrils) by the algorithm and learn each of them. Therefore, as compared with the conventional learning method, the accuracy of a learning result can be improved by using deep learning.

Figure 4:
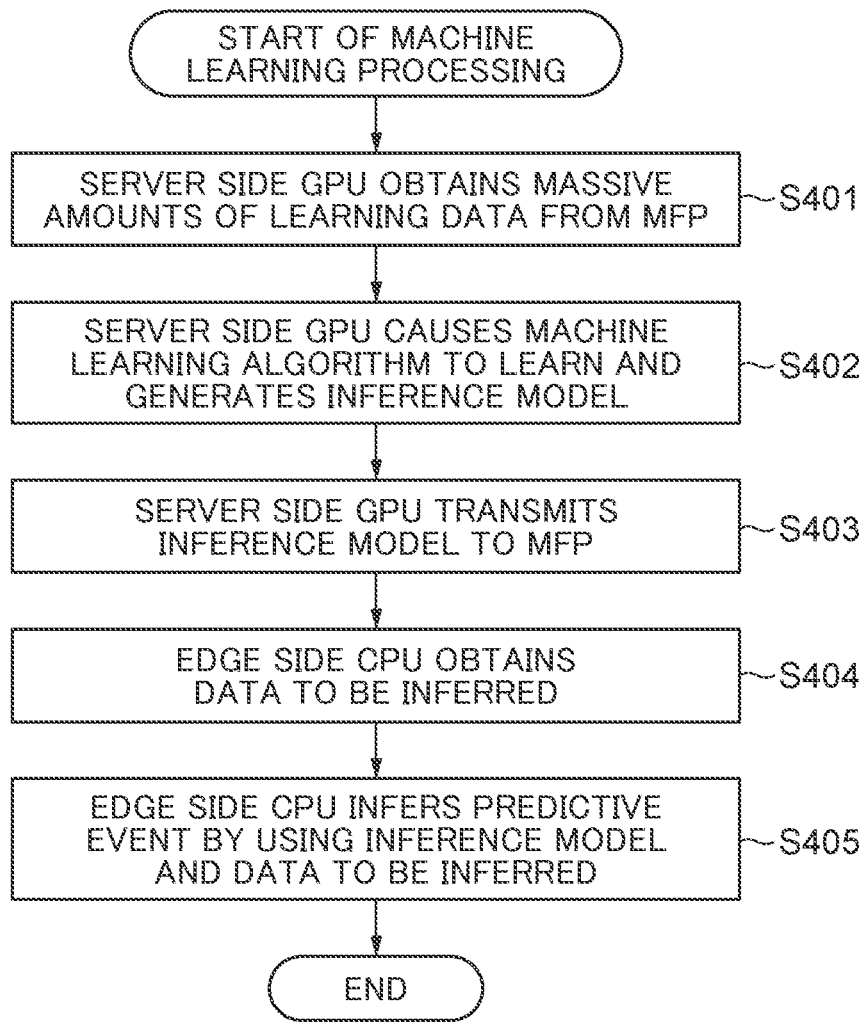
FIG. 4 is a flowchart of a machine learning processing executed in the learning system.

FIG. 4 is a flowchart of a machine learning processing executed in the learning system 30 of FIG. 3.

As shown in FIG. 4, at first, in a step S401, a GPU (Graphic Processing Unit) mounted on the server 321 (hereinafter referred to as "server side GPU") obtains a large amount of detection data for learning (the learning data) from the MFP 1 being the edge device (hereinafter simply referred to as "MFP 1").

In a step S402, the server side GPU causes a machine learning algorithm to learn the large amount of detection data for learning obtained in the step S401, and generates an inference model.

In a step S403, the server side GPU, which functions as a model transmission unit, transmits the inference model generated in the step S402 to the MFP 1.

In a step S404, the main CPU 201 mounted on the MFP 1 (hereinafter referred to as "edge side CPU") newly obtains the detection data from the group of edge side sensors, and uses the detection data obtained as data to be inferred.

In a step S405, the edge side CPU infers a predictive event such as a failure of the HDD device 6 by executing an inference processing by using the data to be inferred obtained in the step S404 and the inference model generated in the step S402, and then terminates the machine learning processing.

Figure 5A:
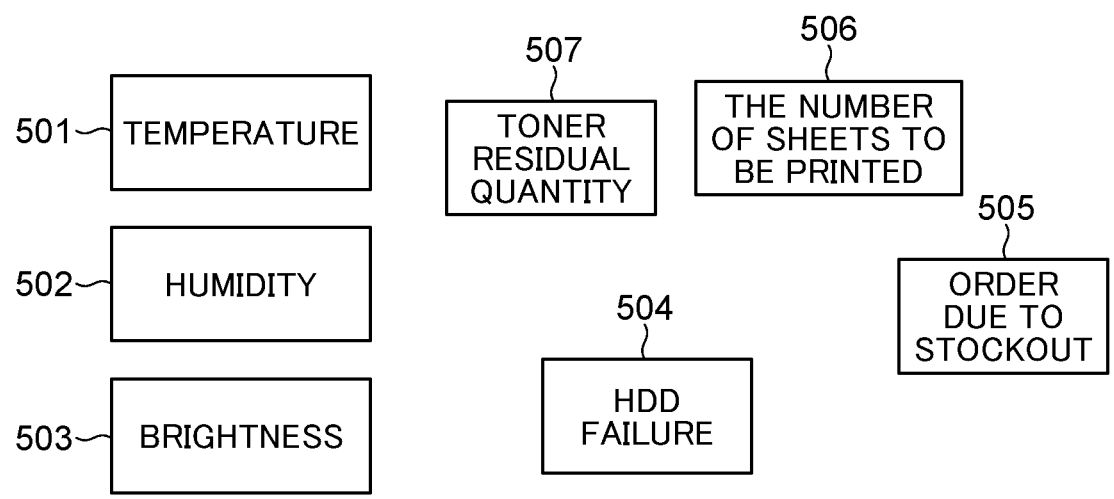
Figure 5B:
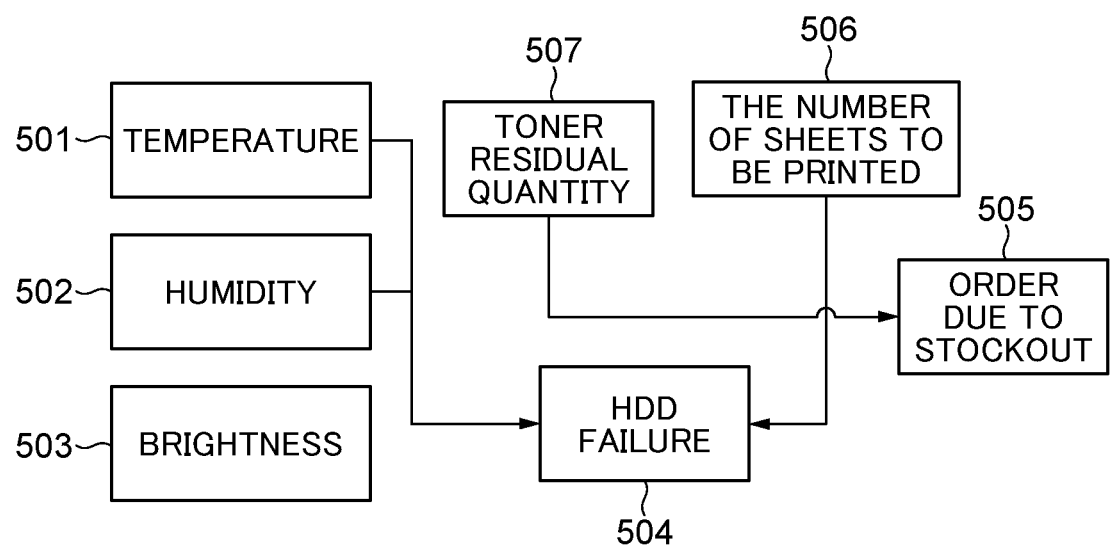

FIGS. 5A, 5B and 5C are diagrams for explaining the inference model generated in the step S402 of FIG. 4.

As described with reference to FIG. 3, in the user environment 300 of the learning system 30, the group of edge side sensors is installed on inside and outside of the MFP 1. Therefore, it is possible for the MFP 1 to obtain a plurality of kinds of detection data collected by the group of edge side sensors and transfer the plurality of kinds of detection data obtained to the server 321.

FIG. 5A exemplifies the detection data that is collected from the group of edge side sensors. As shown in FIG. 5A, an environmental temperature 501, a humidity 502, a brightness 503, the failure of the HDD device 6 (hereinafter referred to as "an HDD failure") 504, an order from the user due to stockout (hereinafter referred to as "an order due to stockout") 505, the number of sheets to be printed 506 and a toner residual quantity 507 are collected from the edge device.

FIG. 5B exemplifies learning results of the detection data collected. As shown in FIG. 5B, one learning result (one inference model) that the temperature 501, the humidity 502 and the number of sheets to be printed 506 are in correlation with the HDD failure 504, has been obtained. Further, as shown in FIG. 5B, another learning result (another inference model) that the toner residual quantity 507 is in correlation with the order due to stockout 505, has been obtained.

As described above, such a learning process is performed on the server 321 side, and the accuracy (the certainty factor) of the inference model improves as the detection data increases. It is possible for the MFP 1 to infer the predictive event such as a failure occurring inside the MFP 1 by using an inference model with the accuracy above a certain level that is transmitted from the server 321.

For example, in the case of obtaining the temperature, the humidity and the number of sheets to be printed that are collected by the group of edge side sensors, the MFP 1 collates the inference model transmitted from the server 321. As shown in FIG. 5C, as a result of this collation, it becomes possible for the MFP 1 to predict failures such as "the HDD device 6 is broken" and "the HDD device 6 fails due to morning condensation, and as a result, the start-up time of the MFP 1 becomes longer than 1 minute".

FIG. 6 is a table used for an explanation about computing devices that are used in the MFP 1 and the server 321.

As shown in FIG. 6, generally speaking, there are three types of computing devices that play the role of computing in a computer system: CPUs, GPUs and ASICs (Application Specific Integrated Circuit). The features of each are shown below.

In terms of general-purpose property, CPUs are the highest and ASICs are the lowest. On the other hand, in terms of performance (processing power), ASICs are the highest and CPUs are the lowest.

Therefore, CPUs are generally used as devices that perform an overall control, and control input/output devices and storages that require general-purpose property.

On the other hand, ASICs can perform only predetermined process(es), receive predetermined input(s), and can output only predetermined output(s), but have a very high processing speed.

Further, GPUs are not as versatile as CPUs, but GPUs can be programmed to a certain extent (that is, operation(s) can be changed after shipment), and can perform simple processing with higher performance than CPUs.

The reason is that CPUs have a larger computation processing power of one core than GPUs, so CPUs are strong against program branching (i.e., changing the processing from the middle) and are suitable for complicated computations, while GPUs have more cores than CPUs, so GPUs have high performance for performing a large amount of simple processing. Therefore, GPUs are often used for drawing images and machine learning with many matrix calculations.

Moreover, ASICs for learning (for example, a TPU (Tensor Processing Unit) developed by Google) may be used for machine learning.

However, in the case that the above-mentioned deep learning is used in machine learning, ASICs that mainly perform parallel processing, that is, a large amount of simple processing at the same time and whose operation cannot be changed at all, cannot be used.

In some cases, CPUs perform inference. For example, CPUs can perform inference by performing parallel processing with SIMD (Single Instruction Multiple Data) command, which is one of vector neural network instructions developed by Intel. The SIMD command is a command for processing a plurality of data with one command.

On the other hand, due to the evolution of GPUs in recent years, computational resources originally used for drawing are often applied to purposes other than image processing. That is, heterogeneous computing, in which CPUs control the entire system and cause GPUs to perform simple calculation processing with a heavy load, has become common, and recently, the heterogeneous computing is widely used in supercomputers and machine learning calculations. GPUs used in situations other than drawing in this way are also called GPGPUs.

Therefore, as shown in FIG. 6, ASICs and low-performance CPUs are generally mounted on edge devices used to realize the specific functions. For example, in a surveillance camera as an edge device, an ASIC executes image processing of videos captured, while a low-performance CPU (the edge side CPU) executes processing other than image processing. On the other hand, a GPU (the server side GPU) and a high-performance CPU are generally mounted on the server that is used to realize a wide variety of functions.

Here, in the learning system 30 of FIG. 3, the server side GPU performs learning by using the detection data that is collected in the user environment 300 and is transferred to the server 321. In this situation, in the case that there is a large amount of the detection data collected in the user environment 300, when all of the large amount of the detection data is transferred to the server 321, an issue that a band of the network line 310 will be oppressed, occurs.

Therefore, in the first embodiment, when the edge side CPU newly obtains the detection data, it not only infers the predictive event (the steps S404 and S405 of FIG. 4), but also judges whether or not to transfer the detection data newly obtained to the server 321 on the basis of the inferred predictive event.

That is to say, in a case that the above inferred predictive event is neither of predictive events shown in FIG. 5C (hereinafter, this case is referred to as "not related to the existing inference model"), the edge side CPU controls so as not to transfer the detection data newly obtained to the server 321.

FIG. 7 is a flowchart of the data transfer control processing according to the first embodiment, executed by the edge side CPU that functions as a data transfer unit.

The data transfer control processing is on an assumption that at a stage where the learning of all the inference models by means of the server side GPU is completed, all the inference models are transmitted to the MFP 1 and then stored in the HDD device 6 as the existing inference models. That is to say, until the learning of all the inference models by means of the server side GPU is completed, all the detection data collected in the user environment 300 is transferred to the server 321. Further, the inference model after the learning is completed, is periodically transmitted from the server 321 to the MFP 1.

Moreover, in the following description, a case where the MFP 1 has the edge side CPU that executes the data transfer control processing will be described, but the present disclosure is not limited to this, as long as it is a device having a general-purpose CPU that is located in the user environment 300. Therefore, for example, the on premise server 303 may have the edge side CPU that executes the data transfer control processing.

At first, in a step S701, the edge side CPU (the main CPU 201) obtains the detection data collected by the group of edge side sensors.

In a step S702, the edge side CPU judges whether or not the detection data obtained in the step S701 is related to the existing inference model. For example, in the case that the existing inference model is an inference model, which predicts a failure rate for HDD on the basis of the detection data of the humidity and the number of sheets to be printed, the edge side CPU judges that the detection data of the brightness is not related to this inference model.

In the step S702, in the case of judging that the detection data obtained in the step S701 is related to the existing inference model, the processing proceeds to a step S703, the edge side CPU transfers the detection data obtained in the step S701 to the server 321 for additional learning of the existing inference model related to the detection data obtained in the step S701, and then terminates the data transfer control processing. Moreover, the server 321 performs the additional learning of the inference model related to the detection data transferred to itself.

On the other hand, in the step S702, in the case of judging that the detection data obtained in the step S701 is not related to the existing inference model, the processing proceeds to a step S704, the edge side CPU performs a processing such as deletion without transferring the detection data obtained in the step S701 to the server 321, and then terminates the data transfer control processing.

According to the data transfer control processing, it is possible to reduce the amount of the detection data transferred from the MFP 1 to the server 321 after the learning by means of the server 321 is completed. Further, even after the learning is completed, since the detection data required for the additional learning is transmitted, it is possible to further improve the certainty factor of the existing inference model.

Hereinafter, a modification of the data transfer control processing of FIG. 7 will be described.

The data transfer control processing of FIG. 7 is effective in the case that the learning of all the inference models by means of the server 321 is completed and new correlation among a plurality of pieces of the detection data from the group of edge side sensors has not been found.

In contrast with the data transfer control processing of FIG. 7, the following modification is mainly used during the learning by means of the server 321.

FIG. 8A is a diagram for explaining the inference model generated in the server 321 when the modification of the data transfer control processing of FIG. 7 is executed.

Not all predictive events inferred by the inference model are equally useful. For example, predictive events that are directly linked to user experiences or affect financial and brand value, which are problematic from a business point of view, are more useful than other predictive events. Specifically, a predictive event that the HDD is broken is more useful than a predictive event of giving an order due to stockout. Therefore, as shown in FIG. 8A, in order to preferentially resolve more useful predictive events, risk grade ranking for each predictive event is performed in the MFP 1.

As a result, it becomes possible to preferentially transfer the detection data related to a predictive event that the risk grade is high, among the predictive events inferred by an inference model that the learning has not been completed. Therefore, it is possible to suppress the oppression of the band of the network line 310 and a calculation cost of the server 321 side.

Moreover, it is common to set the risk grade ranking for each predictive event depending on organizational goals and system configurations.

Further, the risk grade that is set is relative, and in the case that a more useful predictive event has been found (that is, in the case that an inference model for inferring the more useful predictive event is newly generated by means of the server 321), risk grades of other predictive events may be lowered.

For example, it is assumed that an inference model for inferring a predictive event that "a risk of ignition occurs" with respect to the detection data of "continuous energization" and "controller is out of control" is newly generated by means of the server 321. In this case, since this predictive event is a predictive event that is more problematic from the business point of view than other predictive events, its risk grade is set higher than other predictive events shown in FIG. 8A. That is, the risk grades of other predictive events are relatively lowered.

However, in the case that the inference model for inferring the predictive event that "a risk of ignition occurs" is newly generated at a timing when the learning of other inference models is completed, it is necessary to preferentially perform the learning of this inference model.

As mentioned above, from the business point of view, it is necessary to quickly raise the certainty factor of this inference model. Further, from a technical point of view, it is also necessary to quickly raise the certainty factor of this inference model for the following two reasons. The first reason is that even in the case of transferring the detection data having a low relationship with a predictive event that the risk grade is low from the MFP 1 to the server 321, since it is impossible for the server 321 to perform the learning that should be preferentially perform, the band of the network line 310 is wasted. The second reason is that the learning processing of an inference model for inferring the predictive event that the risk grade is low, also consumes the performance of the server 321.

Therefore, the modification suppresses transferring the detection data having a low relationship with the predictive event that the risk grade is high from the MFP 1 to the server 321.

Figure 8B:
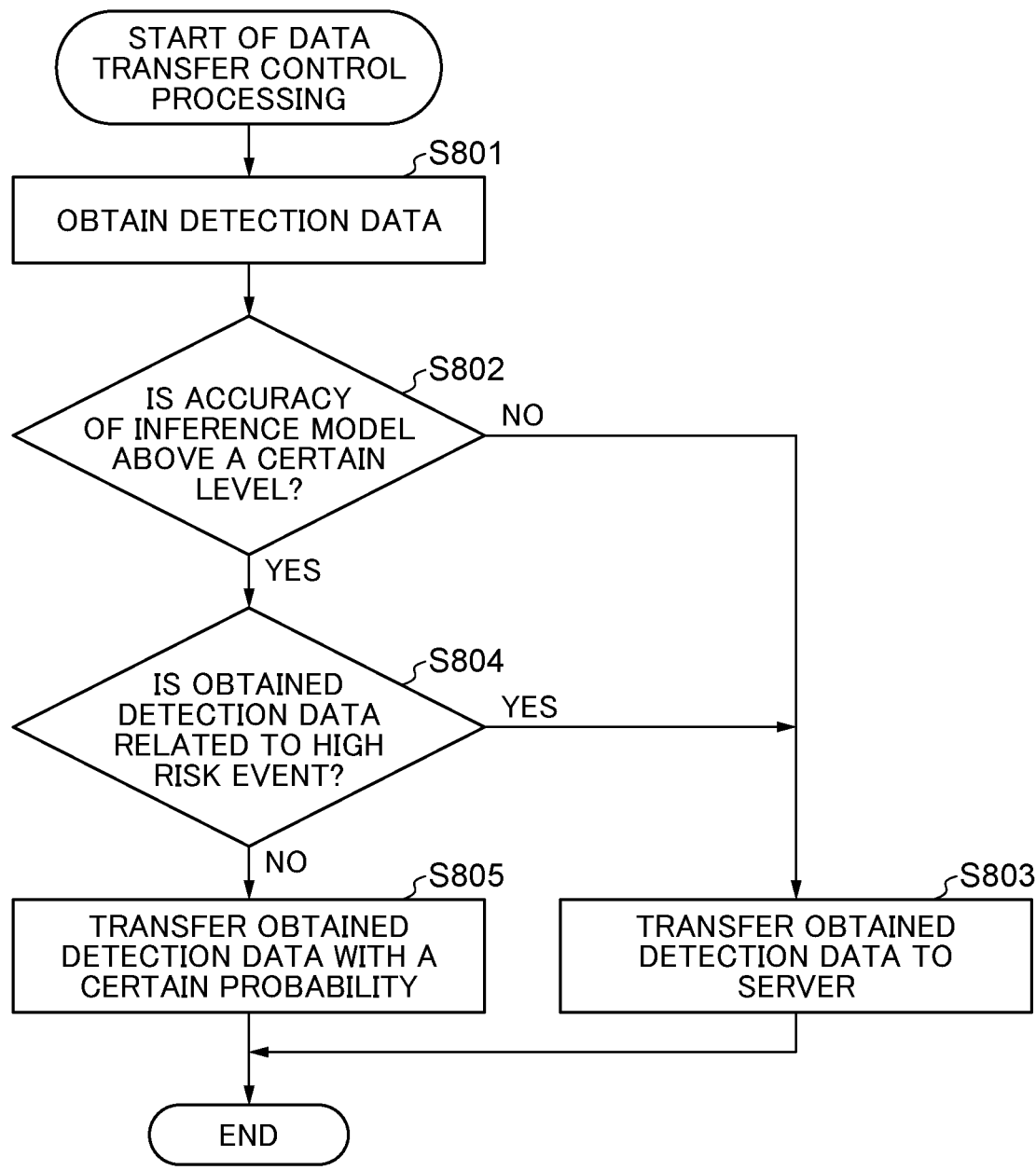
FIG. 8B is a flowchart of the modification of the data transfer control processing according to the first embodiment, executed by an edge side CPU.

FIG. 8B is a flowchart of the modification of the data transfer control processing according to the first embodiment, executed by the edge side CPU.

The data transfer control processing of FIG. 8B is on an assumption that when the server 321 newly generates an inference model, the server 321 transmits this inference model that is newly generated and in a state where the learning is not progressing to the MFP 1, and then periodically transmits this inference model to the MFP 1.

At first, in a step S801, the edge side CPU (the main CPU 201) obtains the detection data collected by the group of edge side sensors.

In a step S802, the edge side CPU performs a judgement whether or not the certainty factor (the accuracy) of the inference model newly transmitted from the server 321 is above a certain level (is equal to or larger than a predetermined value). As a result of the judgement, in the case that the certainty factor of the inference model newly transmitted from the server 321 is under the certain level (is smaller than the predetermined value), that is, in the case that the learning using a large amount of the detection data has not been completed, the processing proceeds to a step S803, on the other hand, in the case that the certainty factor of the inference model newly transmitted from the server 321 is above the certain level, the processing proceeds to a step S804.

In the step S803, the edge side CPU transfers the detection data obtained in the step S801 to the server 321 for learning of the inference model newly transmitted from the server 321, and then terminates the data transfer control processing of FIG. 8B. Therefore, it is possible to make the server 321 to perform the learning of this inference model in preference to other inference models.

In the step S804, the edge side CPU that functions as a setting unit judges whether or not the detection data obtained in the step S801 is related to the predictive event that the risk grade is high (hereinafter referred to as "a high risk event")

among predictive events inferred by each inference model that is transmitted from the server 321 to the MFP 1. For example, in the case that the inference model, which predicts the failure rate for HDD that is the high risk event on the basis of the detection data of the temperature, the humidity and the number of sheets to be printed, is transmitted from the server 321 to the MFP1, the edge side CPU judges that the detection data of the number of people staying in office is not related to the high risk event.

In the step S804, in the case of judging that the detection data obtained in the step S801 is related to the high risk event, the processing proceeds to the step S803, otherwise, the processing proceeds to a step S805.

In the step S803, the edge side CPU transfers the detection data obtained in the step S801 to the server 321 for learning of the inference model that predicts the high risk event judged to be related to the detection data obtained in the step S801, and then terminates the data transfer control processing of FIG. 8B. Therefore, it is possible to make the server 321 to perform the learning of the inference model that predicts the high risk event in preference to other inference models. As a result, it is possible for the MFP 1 to quickly improve the accuracy of preventing the occurrence of high risk events.

In the step S805, the edge side CPU transfers the detection data obtained in the step S801 with a certain transmission probability (<100%) to the server 321 for learning of an inference model that predicts a high risk event judged to be not related to the detection data obtained in the step S801, and then terminates the data transfer control processing of FIG. 8B. Therefore, it is possible to reduce the amount of the detection data transferred from the MFP 1 to the server 321.

Moreover, in the step S805 of FIG. 8B, even in the case that the detection data obtained in the step S801 is not related to the high risk event, instead of not transferring the detection data obtained in the step S801 to the server 321 at all, the edge side CPU transfers a part of the detection data obtained in the step S801 to the server 321. This is because there is a possibility that a correlation between the detection data obtained in the step S801 and the high risk event is specified by further learning by means of the server 321.

Further, in the modification, a case where the edge device for executing the data transfer control processing shown in FIG. 8B is the MFP 1 is described, but the edge device is not limited to the MFP 1, as long as it is a device having a general-purpose CPU that is located in the user environment 300. Therefore, for example, the edge device for executing the data transfer control processing of FIG. 8B may be the on premise server 303.

Next, a second embodiment of the present disclosure will now be described with reference to the drawings. In the first embodiment, the detection data is transmitted with a frequency set in advance by a designer from the group of edge side sensors to the MFP 1 as the edge device installed in the user environment 300.

In the case that such an element depending on the designer exists, a certain "prejudice" (bias) also occurs in the learning result of the server 321.

For example, in the case that the designer sets so as to transmit humidity information at intervals of one second from the group of edge side sensors to the MFP 1 and transmit temperature information at intervals of sixty seconds from the group of edge side sensors to the MFP 1, the MFP 1 will obtain detection data about humidity whose amount is sixty times of the amount of detection data about temperature. In the case that the MFP 1 transfers all the obtained detection data to the server 321, an inference model regarding humidity is more easily formed in the server 321.

That is, even in the case that a predictive event inferred by an inference model regarding temperature has a higher risk grade than a predictive event inferred by the inference model regarding humidity, in such a case, it takes time to form the inference model regarding temperature, or it becomes impossible to form the inference model regarding temperature.

Therefore, in the second embodiment, in order to suppress the occurrence of such a certain "prejudice" (bias), rare detection data is preferentially transferred from the MFP 1 to the server 321.

Hereinafter, since the hardware configuration of the second embodiment is the same as that of the first embodiment, the same configuration is designated by the same reference numerals, and duplicate description will be omitted.

FIG. 9 is a diagram for explaining various inference models generated by machine learning in the second embodiment.

Here, for convenience, a case that the server side GPU generates various inference models by using a genetic algorithm, which is a kind of machine learning method, will be described as an example.

As shown in FIG. 9, an inference model of the genetic algorithm learns a correlation between "a data section" and "a predictive event section".

In the second embodiment, when the server side GPU causes the genetic algorithm to learn the detection data (sensor values, logs, various phenomena, etc.) collected in the user environment 300, inference models 1 to L are formed.

For example, in the case of the inference model 1, a predictive event 1 that "HDD is broken" is inferred from the detection data of "life of HDD<30%" and "the number of sheets to be printed within one month >50,000".

Further, in the case of the inference model 5, a predictive event 3 that "start-up time due to morning condensation >1 min" is inferred from the detection data of "temperature <6° C." and "humidity >60%".

Moreover, the inference models 1 to L shown in FIG. 9 are merely examples for explaining the second embodiment, and different inference models may be formed in an actual environment.

For example, in the case of generating various inference models by using deep learning instead of the genetic algorithm, there is a possibility that contents retained in "the data section" are not detection data that can be understood by humans as shown in FIG. 9 and contents retained in "the predictive event section" are not predictive events that can be understood by humans as shown in FIG. 9. For example, there is a possibility that "the data section" and "the predictive event section" retain various intermediate states or data obtained by synthesizing a plurality of data, etc.

Figure 10:
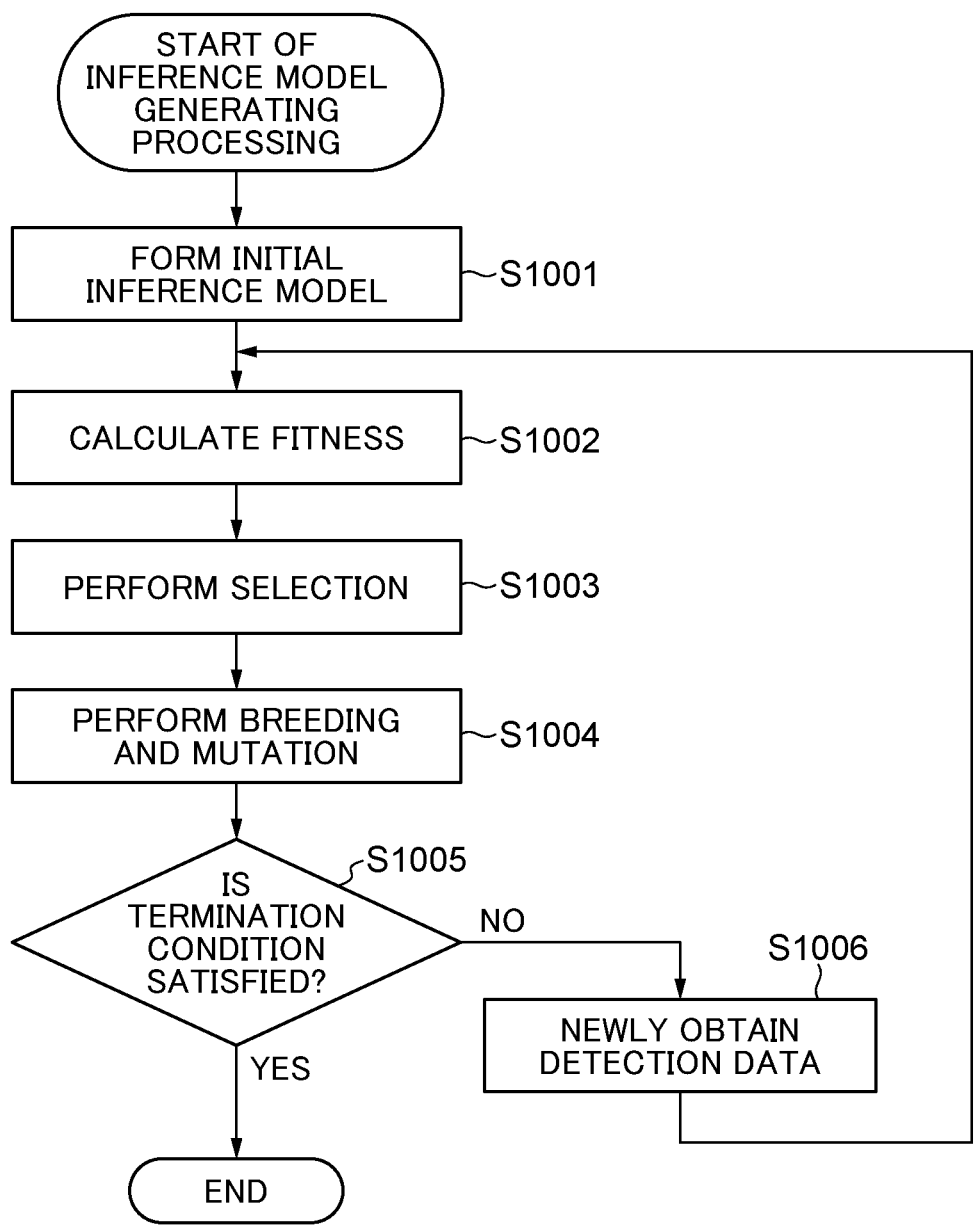
FIG. 10 is a flowchart of an inference model generating processing according to the second embodiment.

FIG. 10 is a flowchart of an inference model generating processing according to the second embodiment.

The inference model generating processing is executed by the server side GPU.

The inference model, in which correlation among a plurality of detection data collected in the user environment 300 is extracted (learned) described above with reference to FIG. 9, is generated by the inference model generating processing.

At first, in a step S1001, before starting the learning, the server side GPU forms an initial inference model (Initial Population). This initial inference model may be designed humanly or generated by random numbers, but it is an inference model in the form of "if conditions A and B are satisfied, a predictive event C can be predicted".

In a step S1002, the server side GPU starts a learning phase, collates the initial inference model formed in the step S1001 with various detection data transferred from the MFP 1, and calculates each fitness. The fitness calculated in the step S1002 can be defined as the certainty factor (prediction accuracy) of the inference model.

In a step S1003, the server side GPU performs a selection that eliminates an inference model having a low fitness from inference models formed in the step S1001 by a certain method (for example, a method of leaving the top 50%).

In a step S1004, the server side GPU performs a breeding (also referred to as Multiply) that generates a next generation inference model from inference models having a relatively high fitness, which are remained after the selection of the step S1003. Furthermore, the server side GPU performs mutation such as exchanging components (the conditions A and B, the predictive event C) of the inference models remained after the selection and changing several components to random numbers.

In a step S1005, the server side GPU judges whether or not a termination condition is satisfied, specifically, whether or not a learning time after starting the learning phase in the step S1002 has elapsed a certain period of time. In the case that the termination condition is satisfied, the server side GPU terminates the inference model generating processing. On the other hand, in the case that the termination condition is not satisfied, the processing proceeds to a step S1006. Moreover, in the step S1005, in the case that the number of times of learning after starting the learning phase in the step S1002 exceeds a certain number of times, the server side GPU may judge that the termination condition is satisfied.

In the step S1006, the server side GPU newly obtain the detection data from the MFP 1, and then the processing returns to the step S1002. That is to say, the learning of the inference model is performed by repeating the fitness calculation process of the step S1002, the selection process of the step S1003, and the breeding process of the step S1004.

Moreover, in the second embodiment, in the case of judging in the step S1005 that the termination condition is satisfied, the cost of the data collection process of the step S1006, the fitness calculation process of the step S1002, the selection process of the step S1003, and the breeding process of the step S1004 is suppressed by terminating the inference model generating processing. However, in the case that it is not necessary to consider the above cost, the inference model generating processing may be configured to have an infinite loop that the processing directly proceeds from the step S1004 to the step S1006.

As described above, according to the inference model generating processing, it is possible to train the inference model by the genetic algorithm that adopts a method similar to the evolution of living organisms in the real world.

That is, "the data section" and "the predictive event section" corresponding to the components of the inference model, correspond to genes (DNA sequences) of the living organisms. The inference model adapts to the environment (the step S1002) in the same way as a biological population, individuals (models) that cannot adapt are eliminated by the selection (the step S1003), and individuals that are remained after the selection perform genetic mutation and generating (breeding) of next generation individuals (the step 1004). As a result, an inference model that is highly adaptable to the environment is gradually formed.

However, in the case of forming an inference model by using the genetic algorithm, when the detection data that can be collected is limited, there is a possibility that an issue called "local optimization" (overfitting) occurs.

As described above, since the inference model obtained by learning fits the obtained detection data, the inference model formed depends on what kind of the detection data is transferred from the MFP 1 to the server 321.

Therefore, in order to obtain inference models that reflect characteristics of the learning system 30, it is necessary to transfer the detection data that reflects the characteristics of the learning system 30 from the MFP 1 to the server 321.

On the other hand, in the learning system 30, since the designer sets that what kind of the detection data the group of edge side sensors located in the user environment 300 collects and how often, there is a possibility that the MFP 1 obtains biased detection data 1100.

Figure 11:
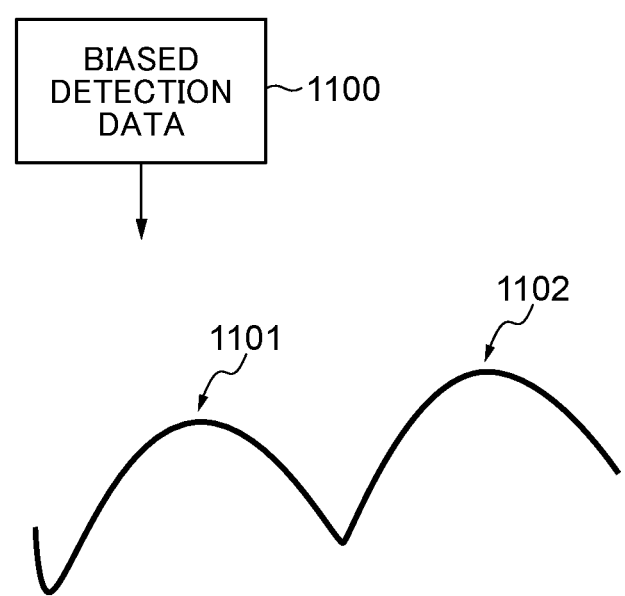
FIG. 11 is a diagram for explaining overfitting.

FIG. 11 shows an example of a case that the learning is performed on the server 321 on the basis of the biased detection data 1100 transferred from the MFP 1. In the case of the biased detection data 1100 that most of the detection data exists on a left side of FIG. 11, a peak of the fitness calculated between the inference model generated by the inference model generating processing of FIG. 10 and the detection data, is in the vicinity of a local optimum value 1101 located on the left side of FIG. 11. However, in some cases, an overall optimum value having a higher fitness than the local optimum value 1101 exists. In the example of FIG. 11, an overall optimum value 1102 exists on a right side thereof. In this case, the inference model generated by the inference model generating processing of FIG. 10 is a model, in which the characteristics of the learning system 30 are not reflected.

Here, there are several algorithmic methods that can resolve the above issue without changing the biased detection data 1100 itself transferred from the MFP 1 to the server 321. For example, there are a method that generates an initial inference model by random numbers, a method that inserts several random number elements (corresponding to mutation of the living organisms) when generating a next generation inference model from a parent generation inference model, and the like.

However, in the case that the bias in the biased detection data 1100 is large (that is, in the case that a large amount of a part of the detection data can be obtained, but almost no other the detection data can be obtained), a convergence time (obtaining a final result) will become long. Moreover, since the initial inference model is generated by random numbers, the learning result may become unstable.

Further, in the case that the learning is performed by using the genetic algorithm as in the second embodiment, overfitting is likely to occur due to its characteristics. For example, even in an environment having a characteristic that the higher the height, the higher the fitness, in the case that the learning is performed on the basis of biased detection data that only one out of 100 people is taller, it is less likely that the characteristic will remain in the next generation inference model.

Therefore, it is preferred that the detection data transferred from the MFP 1 to the server 321 is uniform data with a small bias. As a conventional method for obtaining such uniform data with a small bias, a method called data augmentation that increases data, in which the number of pieces of data obtained is small, is known. For example, in the case of an inference model that detects a predetermined object from an image, it is possible to improve the detection accuracy thereof by duplicating the same image and causing this inference model to learn by this method.

However, in the case of adopting such a conventional method, the data to be learned by the server 321 may become data that is away from reality. This is because the inference model generated by the server 321 is an inference model for performing a prediction, so that the data to be learned by the server 321 is not just numerical values, but time series information is also important.

That is, in the case of the second embodiment, not only the value of the detection data but also the time of occurrence (the time of measuring, the anteroposterior relation of the event) is important.

Therefore, the second embodiment adopts a method of reducing majority data without adopting the conventional method of duplicating and augmenting minority data.

FIG. 12 is a diagram for explaining an outline of a data obtaining control processing according to the second embodiment.

In the data obtaining control processing, the number of times of learning for each inference model in the server 321 shown in FIG. 12 is counted in the cloud 320, and this information (hereinafter referred to as "learning count information") is transferred from the cloud 320 to the MFP 1.

As with the first embodiment, the learning of the inference model in the server 321 is executed by using the detection data transferred from the user environment 300 to the cloud 320.

When the edge side CPU (the main CPU 201) newly obtains the detection data from one sensor out of the group of edge side sensors, the edge side CPU confirm the number of times of learning of the inference model related to the detection data newly obtained on the basis of the learning count information transferred from the cloud 320. As a result of this confirmation, in the case that the number of times of learning is equal to or less than a predetermined number of times, the edge side CPU transfers the detection data newly obtained to the server 321 for additional learning of the inference model related to the detection data newly obtained. On the other hand, in the case that the number of times of learning is more than the predetermined number of times, the edge side CPU does not transfer the detection data newly obtained to the server 321. Furthermore, the edge side CPU may reduce a frequency of transferring the detection data subsequently obtained from the one sensor out of the group of edge side sensors to the server 321.

As a result, as compared with the case of the first embodiment, since the detection data that the number of times of learning is small can easily reach the server 321, it becomes difficult to form an overfitted inference model.

Next, a third embodiment of the present disclosure will now be described with reference to the drawings. Although the MFP 1 executes the data transfer control processing of the second embodiment, predictive events that the certainty factor (the accuracy) of the inference model formed by the server 321 does not increase, exist. For example, these predictive events are transient events and events that are reproducible but extremely unlikely to be collected. Here, as an example of the transient events, for example, there is an event that the main body of the MFP 1 fell down due to mischief. Further, as examples of the above events that are reproducible but extremely unlikely to be collected, there are an event that electric signals are inverted by cosmic rays and the controller 3 of the MFP 1 malfunctions, and an event that the number of people staying in office decreases drastically due to a pandemic.

In the case that these events occur, the learning system 30 is often significantly damaged for the following two reasons. One reason is a human factor that is not acknowledged by the designer because its frequency of occurrence is low. In other words, the designer tends to judge that frequently occurring events out of events that can occur are "serious", so the designer may overlook such "very rare events" or do not give priority to the "very rare events". Another reason is a systematic factor that since the learning system 30 cannot accurately predict such events by inference models, it is impossible to prevent or deal with such events.

Especially in an environment where an automatic control is performed based on a prediction by an inference model, issues due to the systematic factor are likely to occur. For example, in an autonomous driving environment, in the case that a "very rare event", in which a pure white truck appears on a bright background occurs, it is assumed that the inference model determines that the pure white truck is farther than it actually is and an accident will occur.

Therefore, in the third embodiment, in the case that detection data transferred from the MFP 1 to the server 321 is an event that has no—likelihood of—the learning by the server 321, the server 321 sets this detection data as stress test data. And then, the server 321 determines by means of a simulation whether or not the stress test data causes defects of the learning system 30. As a result of this determination, in the case of causing the defects of the learning system 30, risk reduction is realized by performing a design change of the learning system 30. Moreover, although there is a technique that simulatively generates the "very rare event", since this technique has little relevance to the third embodiment, an explanation about this technique is omitted.

Hereinafter, since the hardware configuration of the third embodiment is the same as that of the first embodiment, the same configuration is designated by the same reference numerals, and duplicate description will be omitted.

In the third embodiment, each of events transferred as the detection data from the MFP 1 to the server 321 is classified as an "event that has no learning likelihood" in the case that it is a "very rare event", and is classified as an "event that has learning likelihood" in the case that it is not a "very rare event".

Moreover, the third embodiment is on an assumption that exactly the same data (or a combination of data) does not exist in the events transferred as the detection data from the MFP 1 to the server 321.

In the third embodiment, at first, every time the detection data is newly transferred from the MFP 1 to the cloud 320, an inference model out of the inference models 1 to L that performs a prediction on the basis of the detection data newly transferred is learned in the server 321. After this data transfer and learning processing is executed a plurality of times (here, 5000 times), a classification whether or not there is the learning likelihood of the inference models 1 to L using events newly transferred as the detection data (hereinafter referred to as "novel data"), is performed.

FIG. 13 is a diagram for explaining a method that classifies whether or not there is the learning likelihood of the inference models 1 to L using the novel data. Moreover, the example shown in FIG. 13 is merely an example for explaining the third embodiment, and actual products are not limited to completely correspond with the example shown in FIG. 13.

At first, after the above data transfer and learning processing is performed, the cloud 320 performs a determination whether or not each of the inference models 1 to L is an inference model related to the novel data. A result of this determination is a "relationship with inference model" shown in FIG. 13. In FIG. 13, a case that there is a relationship is indicated by YES, and a case that there is no relationship is indicated by NO. Based on this table shown in FIG. 13, as a numerical value of a "relationship" that indicates a percentage of inference models related to the novel data among the inference models 1 to L, a numerical value of (the number of YES)/L is calculated. The smaller the numerical value indicating the "relationship", the less the learning likelihood of the inference models 1 to L using the novel data.

Further, the cloud 320 sequentially updates the number of times of learning of each model of the inference models 1 to L every time each model is learned. The latest update result at a time of transferring the novel data to the server 321 is "the number of times of learning of said inference model" shown in FIG. 13. Based on this table shown in FIG. 13, as a numerical value that indicates "the number of times of learning" of the novel data, a total value of "the number of times of learning of said inference model" of inference models that the "relationship with inference model" is YES, is calculated. The smaller the numerical value indicating "the number of times of learning", the less the learning likelihood of the inference models 1 to L using the novel data.

Furthermore, the cloud 320 sequentially updates the certainty factor (the accuracy) of each model of the inference models 1 to L every time each model is learned. The latest update result at the time of transferring the novel data to the server 321 is a "prediction/inference accuracy" shown in FIG. 13. Based on this table shown in FIG. 13, as a numerical value that indicates a "prediction accuracy" of the novel data, a total value of the "prediction/inference accuracy" of inference models that the "relationship with inference model" is YES, is calculated. The smaller the numerical value indicating the "prediction accuracy", the less the learning likelihood of the inference models 1 to L using the novel data.

In the third embodiment, a value obtained by performing multiplication of the "relationship", "the number of times of learning" and the "prediction accuracy" of the novel data, is calculated as a rarity evaluation value, and the learning likelihood (a rarity) by the inference models 1 to L of the novel data is measured by using the calculated rarity evaluation value.

Novel data that the rarity evaluation value is small, that is, novel data that any one of the values of the "relationship", "the number of times of learning" and the "prediction accuracy" is small, is classified as data that has no learning likelihood because good results cannot be expected even if it is learned. On the other hand, novel data that the rarity evaluation value is large, is classified as data that has learning likelihood.

In the case that novel data is classified as the data that has no learning likelihood, the novel data is judged as a "very rare event" and is excluded from learning. As a result, it is possible to eliminate the influence of the "very rare event" on the inference model and also save the calculation cost of the server 321.

As described above, the inference model is formed by learning using only the detection data that has learning likelihood, while the detection data that has no learning likelihood is excluded from learning and is used as exceptional stress test data.

Figure 14:
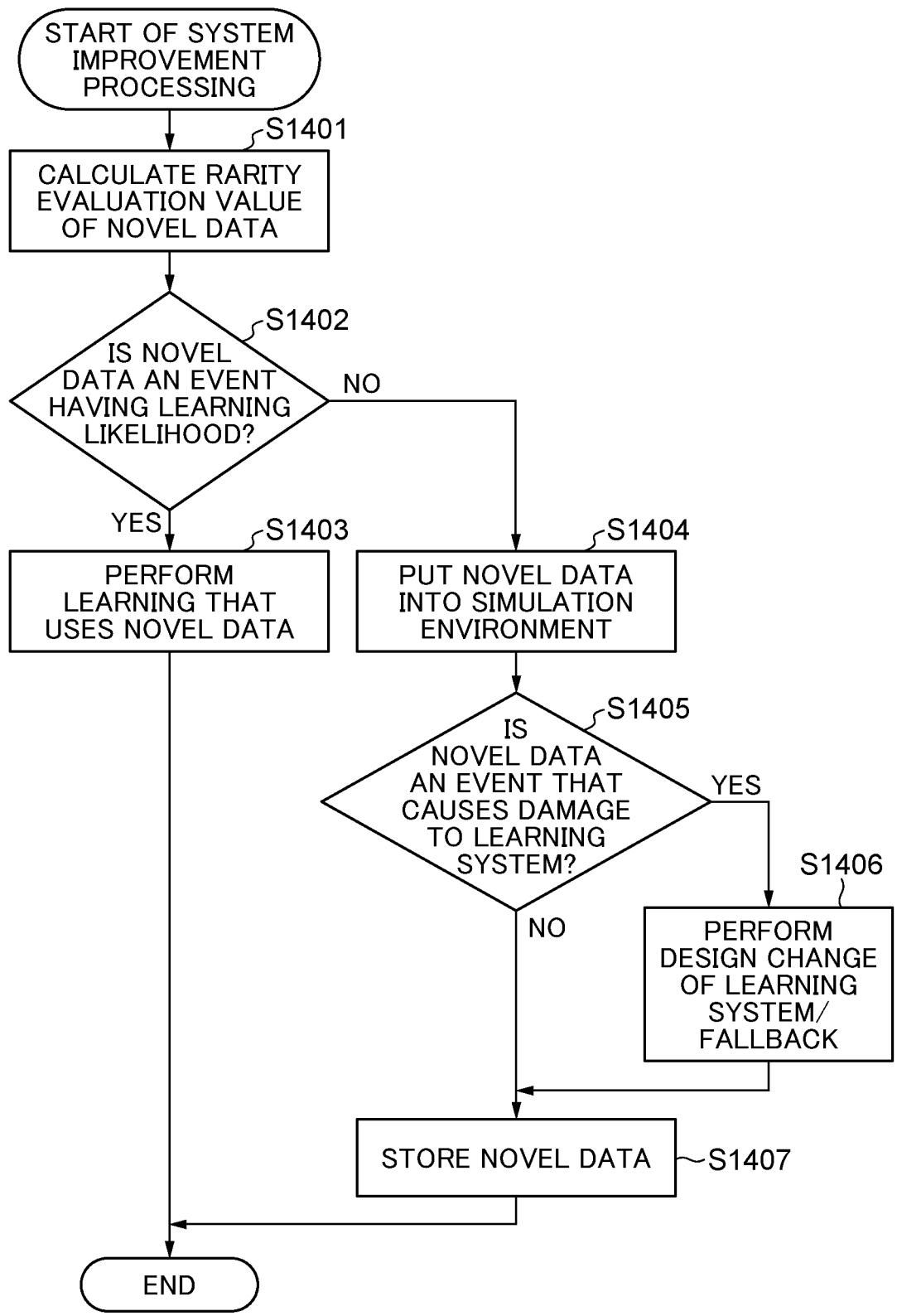
FIG. 14 is a flowchart of a system improvement processing according to the third embodiment.

FIG. 14 is a flowchart of a system improvement processing according to the third embodiment.

As described above, although the detection data judged to be a "very rare event" is excluded from learning because it is judged that it is impossible to form an inference model with a high accuracy even if it is used for learning, in the case that such a "very rare event" occurs, there is a risk of causing great damage to the learning system 30.

Therefore, in the case of judging that detection data transferred from the MFP 1 to the server 321 is a "very rare event", a stress test (that is, a test of how much the learning system 30 is affected if the "very rare event" occurs) is performed by using this detection data. This makes it possible to reduce the damage of the learning system 30 when the "very rare event" occurs.

Moreover, in third embodiment, the cloud 320 has a "simulation environment" capable of simulating the operation of the learning system 30. As a result, in the cloud 320, it is possible to confirm the operation of the learning system 30 close to the actual one.

On the cloud 320 side, when the server side GPU that functions as a novel data obtaining unit obtains detection data of a new event (hereinafter referred to as novel data) transferred from the MFP 1 to the server 321, the server side GPU that also functions as a calculating unit and a classifying unit starts executing the system improvement processing.

At first, in a step S1401, the server side GPU calculates the rarity evaluation value of the novel data. Further, in the case that the novel data is an event that has not been learned in the server 321, the rarity evaluation value of the novel data is set to 0.

In a step S1402, the server side GPU performs a judgement whether or not the novel data is an event that has likelihood of the learning by the server 321 on the basis of the rarity evaluation value obtained in the step S1401.

As a result of the judgement of the step S1402, in the case that the novel data is the event that has learning likelihood, the processing proceeds to a step S1403, the server side GPU performs learning that uses the novel data. On the other hand, in the case that the novel data is the event that has no learning likelihood, the processing proceeds to a step S1404, the server side GPU excludes the novel data from learning and puts the novel data into the simulation environment, the processing proceeds to a step S1405.

In the step S1405, the server side GPU performs a simulation of the novel data put into the simulation environment, and performs a judgement whether or not the novel data is an event that causes damage to the learning system 30 on the basis of a result of the simulation. For example, in the case that novel data is an event that conflicts with a "nonnegotiable criterion" set by the user in advance such as a criterion that the temperature of the user environment 300 is equal to or lower than a certain temperature or a criterion that a distance estimation error is equal to or lower than a certain level, the server side GPU judges that this novel data is an event that causes damage to the learning system 30.

As a result of the judgement of the step S1405, in the case that the novel data is an event that does not cause damage, the processing proceeds to a step S1407. On the other hand, in the case that the novel data is an event that causes damage, the processing proceeds to a step S1406, the server side GPU performs the design change or a fallback of the learning system 30, and then the processing proceeds to the step S1407.

In the step S1407, the server side GPU stores the novel data in a memory (not shown) within the cloud 320. This is because there is a possibility that the novel data is used for the stress test in the future. And then, the server side GPU terminates the system improvement processing.

Moreover, the purpose of performing the design change of the learning system 30, etc. in the step S1406 is to reduce or avoid damage to the learning system 30 due to the event of the novel data. For example, in the case of obtaining a simulation result that the controller 3 of the MFP 1 fails in the step S1405, the design change of the learning system 30 is performed by operating a second controller (not shown) of the MFP 1 in the step S1406. This makes it possible to prevent the occurrence of accidents in the MFP 1.

Here, the fallback means that in the learning system 30 that performs the automatic control based on a prediction result obtained by the inference model, the automatic control of the learning system 30 is stopped and then switched to a manual control (or a remote takeover).

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-133136, filed Aug. 5, 2020, which is hereby incorporated by reference herein in its entirety.

What is claimed is:

1. A system comprising:
a cloud computing system having a server; and
a user environment computing system having an edge electronic device and a group of edge side sensors installed on at least one of inside and outside of the edge electronic device,
wherein the cloud computing system and the user environment computing system are connected via a network line,
wherein the user environment computing system comprises
a data transfer unit configured to transfer a plurality of kinds of detection data collected by the group of edge side sensors to the cloud computing system for learning of an inference model generated by the server,
wherein the cloud computing system comprises
a model transmission unit configured to transmit the inference model to the edge electronic device after the learning of the inference model performed by the server is completed, and
wherein after the inference model is transmitted by the model transmission unit, when the detection data is newly obtained from one sensor out of the group of edge side sensors, in a case that the detection data newly obtained is not related to the inference model, the data transfer unit does not transfer the detection data newly obtained to the server, while in a case that the detection data newly obtained is related to the inference model, the data transfer unit transfers the detection data newly obtained to the server for additional learning of the inference model.

2. The system according to claim 1, wherein
the model transmission unit periodically transmits the inference model from the cloud computing system to the edge electronic device.

3. A system comprising:
a cloud computing system having a server; and
a user environment computing system having an edge electronic device and a group of edge side sensors installed on at least one of inside and outside of the edge electronic device,
wherein the cloud computing system and the user environment computing system are connected via a network line,
wherein the user environment computing system comprises
a data transfer unit configured to transfer a plurality of kinds of detection data collected by the group of edge side sensors to the cloud computing system for learning of an inference model generated by the server,
wherein the cloud computing system comprises
a model transmission unit configured to transmit the inference model to the edge electronic device during the learning of the inference model performed by the server, and
wherein after the inference model is transmitted by the model transmission unit, when the detection data is newly obtained from one sensor out of the group of edge side sensors, in a case that a certainty factor of the inference model is smaller than a predetermined value, the data transfer unit transfers the detection data newly obtained to the server for additional learning of the inference model.

4. The system according to claim 3, further comprising:
a setting unit configured to set whether or not a predictive event inferred by the inference model is a high risk event,
wherein in a case that the certainty factor of the inference model is equal to or larger than the predetermined value and the detection data newly obtained is related to the high risk event, the data transfer unit transfers the detection data newly obtained for the learning of the inference model.

5. The system according to claim 4, wherein
in a case that the certainty factor of the inference model is equal to or larger than the predetermined value and the detection data newly obtained is not related to the high risk event, the data transfer unit transfers the detection data newly obtained with a certain transmission probability to the server.

6. A system comprising:
a cloud computing system having a server; and
a user environment computing system having an edge electronic device and a group of edge side sensors installed on at least one of inside and outside of the edge electronic device,
wherein the cloud computing system and the user environment computing system are connected via a network line,
wherein the user environment computing system comprises
a data transfer unit configured to transfer a plurality of kinds of detection data collected by the group of edge side sensors to the cloud computing system for learning of a plurality of inference models generated by the server, and
wherein in a case that the number of times of learning on the server of an inference model related to the detection data newly obtained from one sensor out of the group of edge side sensors among the plurality of inference models is equal to or less than a predetermined number of times, the data transfer unit transfers the detection data newly obtained to the server for additional learning of the inference model.

7. The system according to claim 6, wherein
in a case that the number of times of learning on the server of an inference model related to the detection data newly obtained from one sensor out of the group of edge side sensors among the plurality of inference models is more than the predetermined number of times, the data transfer unit does not transfer the detection data newly obtained to the server.

8. The system according to claim 6, wherein
in a case that the number of times of learning on the server of an inference model related to the detection data newly obtained from one sensor out of the group of edge side sensors among the plurality of inference models is more than the predetermined number of times, the data transfer unit reduces a frequency of transferring the detection data subsequently obtained from one sensor out of the group of edge side sensors to the server.

9. A system comprising:
a cloud computing system having a server; and
a user environment computing system having an edge electronic device and a group of edge side sensors installed on at least one of inside and outside of the edge electronic device,
wherein the cloud computing system and the user environment computing system are connected via a network line,
wherein the user environment computing system comprises
a data transfer unit configured to transfer a plurality of kinds of detection data collected by the group of edge side sensors from the user environment computing system to the cloud computing system for learning of a plurality of inference models generated by the server,
wherein the cloud computing system comprises:
a novel data obtaining unit configured to obtain an event newly transferred as the detection data by the data transfer unit as novel data;
a calculating unit configured to calculate a rarity evaluation value by using the novel data and the plurality of inference models; and
a classifying unit configured to classify whether the novel data is data that has no learning likelihood of the plurality of inference models or data that has learning likelihood of the plurality of inference models based on the rarity evaluation value, and
wherein in a case that the novel data is classified as the data that has learning likelihood by the classifying unit, the novel data is used for the learning of the plurality of inference models.

10. The system according to claim 9, wherein
the calculating unit:
calculates a first numerical value that indicates a percentage of inference models related to the novel data among the plurality of inference models,
calculates a second numerical value that indicates a total value of the number of times of learning of the inference models related to the novel data among the plurality of inference models,
calculates a third numerical value that indicates a total value of a certainty factor of the inference models related to the novel data among the plurality of inference models, and
calculates the rarity evaluation value based on the first numerical value, the second numerical value and the third numerical value.

11. The system according to claim 9, wherein
in a case that the novel data is classified as the data that has no learning likelihood by the classifying unit, the novel data is not used for the learning of the plurality of inference models, but is used for a stress test.

12. The system according to claim 11, wherein
a risk measured by the stress test is reflected in a design change.

13. An electronic apparatus comprising:
a group of edge side sensors installed on at least one of inside and outside of the electronic apparatus,
wherein the electronic apparatus is connected to a cloud computing system having a server via a network line,
wherein the electronic apparatus comprises
a data transfer unit configured to transfer a plurality of kinds of detection data collected by the group of edge side sensors to the cloud computing system for learning of an inference model generated by the server, and
wherein after the learning of the inference model performed by the server is completed and the inference model is transferred from the cloud computing system, when the detection data is newly obtained from one sensor out of the group of edge side sensors, in a case that the detection data newly obtained is not related to the inference model, the data transfer unit does not transfer the detection data newly obtained to the server, while in a case that the detection data newly obtained is related to the inference model, the data transfer unit transfers the detection data newly obtained to the server for additional learning of the inference model.

14. An electronic apparatus comprising:
a group of edge side sensors installed on at least one of inside and outside of the electronic apparatus,
wherein the electronic apparatus is connected to a cloud computing system having a server via a network line,
wherein the electronic apparatus comprises
a data transfer unit configured to transfer a plurality of kinds of detection data collected by the group of edge side sensors to the cloud computing system for learning of an inference model generated by the server, and
wherein after the inference model is transferred from the cloud computing system during the learning of the inference model performed by the server, when the detection data is newly obtained from one sensor out of the group of edge side sensors, in a case that a certainty factor of the inference model is smaller than a predetermined value, the data transfer unit transfers the detection data newly obtained to the server for additional learning of the inference model.

15. An electronic apparatus comprising:
a group of edge side sensors installed on at least one of inside and outside of the electronic apparatus,
wherein the electronic apparatus is connected to a cloud computing system having a server via a network line,
wherein the electronic apparatus comprises
a data transfer unit configured to transfer a plurality of kinds of detection data collected by the group of edge side sensors to the cloud computing system for learning of a plurality of inference models generated by the server, and
wherein in a case that the number of times of learning on the server of an inference model related to the detection data newly obtained from one sensor out of the group of edge side sensors among the plurality of inference models is equal to or less than a predetermined number of times, the data transfer unit transfers the detection data newly obtained to the server for additional learning of the inference model.

16. A control method for an electronic apparatus that comprises a group of edge side sensors installed on at least one of inside and outside of the electronic apparatus, the electronic apparatus connected to a cloud computing system having a server via a network line, the control method comprising:
transferring a plurality of kinds of detection data collected by the group of edge side sensors to the cloud computing system for learning of an inference model generated by the server; and
after the learning of the inference model performed by the server is completed and the inference model is transferred from the cloud computing system, when the detection data is newly obtained from one sensor out of the group of edge side sensors, in a case that the detection data newly obtained is not related to the inference model, not transferring the detection data newly obtained to the server, while in a case that the detection data newly obtained is related to the inference model, transferring the detection data newly obtained to the server for additional learning of the inference model.

17. A control method for an electronic apparatus that comprises a group of edge side sensors installed on at least one of inside and outside of the electronic apparatus, the electronic apparatus connected to a cloud computing system having a server via a network line, the control method comprising:
transferring a plurality of kinds of detection data collected by the group of edge side sensors to the cloud computing system for learning of an inference model generated by the server; and
after the inference model is transferred from the cloud computing system during the learning of the inference model performed by the server, when the detection data is newly obtained from one sensor out of the group of edge side sensors, in a case that a certainty factor of the inference model is smaller than a predetermined value, transferring the detection data newly obtained to the server for additional learning of the inference model.

18. A control method for an electronic apparatus that comprises a group of edge side sensors installed on at least one of inside and outside of the electronic apparatus, the electronic apparatus connected to a cloud computing system having a server via a network line, the control method comprising:
transferring a plurality of kinds of detection data collected by the group of edge side sensors to the cloud computing system for learning of a plurality of inference models generated by the server; and
in a case that the number of times of learning on the server of an inference model related to the detection data newly obtained from one sensor out of the group of edge side sensors among the plurality of inference models is equal to or less than a predetermined number of times, transferring the detection data newly obtained to the server for additional learning of the inference model.

19. A non-transitory computer-readable storage medium storing a program for causing a computer to execute a control method for an electronic apparatus that comprises a group of edge side sensors installed on at least one of inside and outside of the electronic apparatus, the electronic apparatus connected to a cloud computing system having a server via a network line, the control method comprising:
transferring a plurality of kinds of detection data collected by the group of edge side sensors to the cloud computing system for learning of an inference model generated by the server; and
after the learning of the inference model performed by the server is completed and the inference model is transferred from the cloud computing system, when the detection data is newly obtained from one sensor out of the group of edge side sensors, in a case that the detection data newly obtained is not related to the inference model, not transferring the detection data newly obtained to the server, while in a case that the detection data newly obtained is related to the inference model, transferring the detection data newly obtained to the server for additional learning of the inference model.

20. A non-transitory computer-readable storage medium storing a program for causing a computer to execute a control method for an electronic apparatus that comprises a group of edge side sensors installed on at least one of inside and outside of the electronic apparatus, the electronic apparatus connected to a cloud computing system having a server via a network line, the control method comprising:
transferring a plurality of kinds of detection data collected by the group of edge side sensors to the cloud computing system for learning of an inference model generated by the server; and
after the inference model is transferred from the cloud computing system during the learning of the inference model performed by the server, when the detection data is newly obtained from one sensor out of the group of edge side sensors, in a case that a certainty factor of the inference model is smaller than a predetermined value, transferring the detection data newly obtained to the server for additional learning of the inference model.

21. A non-transitory computer-readable storage medium storing a program for causing a computer to execute a control method for an electronic apparatus that comprises a group of edge side sensors installed on at least one of inside and outside of the electronic apparatus, the electronic apparatus connected to a cloud computing system having a server via a network line, the control method comprising:
transferring a plurality of kinds of detection data collected by the group of edge side sensors to the cloud computing system for learning of a plurality of inference models generated by the server; and in a case that the number of times of learning on the server of an inference model related to the detection data newly obtained from one sensor out of the group of edge side sensors among the plurality of inference models is equal to or less than a predetermined number of times, transferring the detection data newly obtained to the server for additional learning of the inference model.

* * * * *